United States Patent
Zushi et al.

(10) Patent No.: US 8,346,377 B2
(45) Date of Patent: Jan. 1, 2013

(54) ELECTRONIC CONTROL APPARATUS

(75) Inventors: Yuji Zushi, Chiyoda-ku (JP); Shinsuke Suzuki, Chiyoda-ku (JP); Akihiro Ishii, Chiyoda-ku (JP)

(73) Assignee: Mitsubishi Electric Corp., Tokyo (JP)

( * ) Notice: Subject to any disclaimer, the term of this patent is extended or adjusted under 35 U.S.C. 154(b) by 273 days.

(21) Appl. No.: 12/907,514

(22) Filed: Oct. 19, 2010

(65) Prior Publication Data

US 2011/0276191 A1 Nov. 10, 2011

(30) Foreign Application Priority Data

May 10, 2010 (JP) ................................. 2010-108206

(51) Int. Cl.
*G05B 11/01* (2006.01)
(52) U.S. Cl. .................. 700/22; 700/4; 700/12; 700/14; 700/74; 700/292; 700/293
(58) Field of Classification Search ................ 700/4, 12, 700/14, 19, 20, 22, 74, 82, 292, 293; 702/132
See application file for complete search history.

(56) References Cited

U.S. PATENT DOCUMENTS

| 2004/0027750 A1* | 2/2004 | Minami et al. ................... 361/62 |
| 2009/0187285 A1* | 7/2009 | Yaney et al. ................... 700/292 |

FOREIGN PATENT DOCUMENTS

| JP | 05-262190 A | 10/1993 |
| JP | 07-115354 A | 5/1995 |
| JP | 08-308238 A | 11/1996 |
| JP | 2002-027665 A | 1/2002 |

* cited by examiner

*Primary Examiner* — Sean Shechtman
(74) *Attorney, Agent, or Firm* — Sughrue Mion, PLLC

(57) ABSTRACT

An electronic control apparatus 100A is configured in such a way that a CPU 110A reads the conduction current of an opening/closing device 140n in an IPM 190A, by way of serial-parallel converters 114a and 114b and a second multi-channel A/D converter 116b; the opening/closing device 140n is opening/closing-controlled through a serial control signal SRn or a parallel control signal PWMn; and a reading timing control circuit 170n adjusts the reading timing in such a way that, regardless of the kind of the control signal, reading is performed during the period in which the opening/closing device 140n is driven to be closed. As a result, the serial-parallel converter can reduce the number of wiring leads between the IPM and the microprocessor, and the digital conversion value is accurately read, by adjusting the error between the serial-signal timing and the parallel-signal timing.

13 Claims, 17 Drawing Sheets

FIG. 3A

INITIAL SETTING   CPU → IPM

| 7 | 6 | 5 | 4 | 3 | 2 | 1 | 0 | |
|---|---|---|---|---|---|---|---|---|
| INITIAL SETTING COMMAND | | | | BLANK | | | | 301a |
| BLANK | SELECTION COMMAND SLn FOR CHANNELS 1 TO 7 | | | | | | | 301b |
| BLANK | SELECTION COMMAND SLn FOR CHANNELS 8 TO 14 | | | | | | | 301c |

WRITING CONTROL   CPU → IPM

| 7 | 6 | 5 | 4 | 3 | 2 | 1 | 0 | |
|---|---|---|---|---|---|---|---|---|
| WRITING COMMAND | | | | COMMAND CHANNEL NUMBER n | | | | 302a |
| SHn | ON/OFF COMMAND SRn FOR CHANNELS 1 TO 7 | | | | | | | 302b |
| SLn | ON/OFF COMMAND SRn FOR CHANNELS 8 TO 14 | | | | | | | 302c |

302

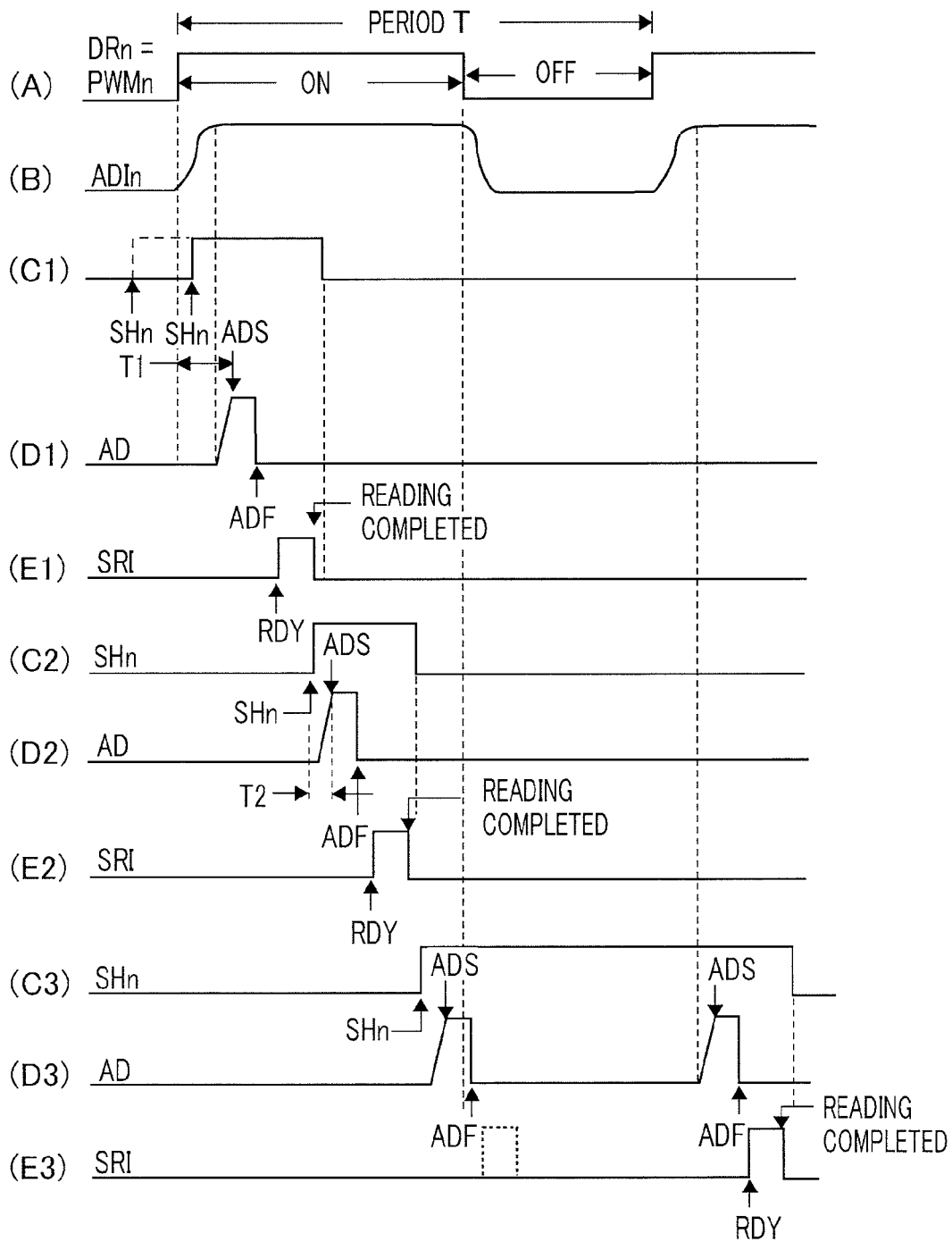

FIG. 12

| THE NUMBER OF ONs | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | DUTY |
|---|---|---|---|---|---|---|---|---|---|---|---|---|---|---|---|---|---|---|---|---|---|---|---|---|---|
| 1  | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 4.2 |
| 2  | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 8.3 |
| 3  | 1 | 0 | 0 | 0 | 0 | 0 | 0 | 0 | 1 | 0 | 0 | 0 | 0 | 0 | 0 | 0 | 1 | 0 | 0 | 0 | 0 | 0 | 0 | 0 | 12.5 |
| 4  | 1 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 16.7 |
| 5  | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 20.8 |
| 6  | 1 | 0 | 0 | 0 | 1 | 0 | 0 | 0 | 1 | 0 | 0 | 0 | 1 | 0 | 0 | 0 | 1 | 0 | 0 | 0 | 1 | 0 | 0 | 0 | 25.0 |
| 7  | 1 | 0 | 0 | 0 | 0 | 0 | 0 | 1 | 0 | 0 | 1 | 0 | 0 | 1 | 0 | 0 | 0 | 1 | 0 | 1 | 0 | 1 | 0 | 0 | 29.2 |
| 8  | 1 | 0 | 0 | 1 | 0 | 0 | 1 | 0 | 0 | 1 | 0 | 0 | 1 | 0 | 0 | 1 | 0 | 0 | 1 | 0 | 0 | 1 | 0 | 0 | 33.3 |
| 9  | 1 | 0 | 0 | 1 | 0 | 0 | 0 | 1 | 0 | 0 | 0 | 1 | 0 | 0 | 1 | 0 | 0 | 1 | 0 | 0 | 1 | 1 | 0 | 0 | 37.5 |
| 10 | 1 | 0 | 1 | 0 | 0 | 1 | 0 | 0 | 1 | 0 | 1 | 0 | 1 | 0 | 0 | 1 | 0 | 1 | 0 | 1 | 0 | 1 | 0 | 0 | 41.7 |
| 11 | 1 | 0 | 1 | 0 | 1 | 0 | 1 | 0 | 1 | 1 | 1 | 0 | 1 | 1 | 1 | 0 | 1 | 1 | 1 | 1 | 1 | 1 | 0 | 0 | 45.8 |
| 12 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 50.0 |
| 13 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 54.2 |
| 14 | 0 | 1 | 1 | 0 | 1 | 1 | 0 | 1 | 1 | 1 | 0 | 1 | 1 | 0 | 1 | 1 | 0 | 1 | 1 | 1 | 0 | 1 | 1 | 1 | 58.3 |
| 15 | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 62.5 |
| 16 | 0 | 1 | 1 | 1 | 1 | 0 | 1 | 1 | 1 | 1 | 0 | 1 | 1 | 1 | 1 | 0 | 1 | 1 | 1 | 1 | 0 | 1 | 1 | 1 | 66.7 |
| 17 | 0 | 1 | 1 | 1 | 1 | 1 | 0 | 1 | 1 | 1 | 0 | 1 | 1 | 1 | 1 | 1 | 0 | 1 | 1 | 1 | 1 | 0 | 1 | 1 | 70.8 |
| 18 | 0 | 1 | 1 | 1 | 1 | 0 | 1 | 1 | 1 | 1 | 1 | 1 | 0 | 1 | 1 | 1 | 1 | 1 | 0 | 1 | 1 | 1 | 1 | 1 | 75.0 |
| 19 | 0 | 1 | 1 | 1 | 1 | 1 | 1 | 1 | 1 | 1 | 1 | 1 | 1 | 1 | 1 | 1 | 1 | 1 | 1 | 1 | 0 | 1 | 1 | 1 | 79.2 |
| 20 | 0 | 1 | 1 | 1 | 1 | 1 | 1 | 1 | 0 | 1 | 1 | 1 | 0 | 1 | 1 | 1 | 1 | 1 | 1 | 1 | 1 | 1 | 1 | 1 | 83.3 |
| 21 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 87.5 |
| 22 | 0 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 1 | 91.7 |
| 23 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 95.8 |
| 24 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 100.0 |

ELECTRONIC CONTROL APPARATUS

BACKGROUND OF THE INVENTION

1. Field of the Invention

The present invention relates to an electronic control apparatus mounted in a vehicle or the like, and particularly to improvement of a signal communication circuit situated between an intelligent power module including a plurality of opening/closing devices, a multi-channel A/D converter, and a serial-parallel converter and a microprocessor that collaborates with the intelligent power module.

2. Description of the Related Art

With regard to an electronic control apparatus mounted in a vehicle or the like, there is publicly known an electronic control apparatus in which a plurality of opening/closing devices that are supplied with electric power from an external power source and perform energization drive of a plurality of electric loads, respective excess current cutoff circuits and overheat shutoff circuits for the opening/closing devices, and an abnormality detection circuit are integrated and are connected in series with a microprocessor by way of a serial-parallel converter.

For example, Patent Document 1 [Japanese Patent Application Laid-Open No. 2002-0273665 (FIG. 1 and ABSTRACT OF THE DISCLOSURE)] discloses an "intelligent power module" in which there are provided a power semiconductor switching device; a driving means for the power semiconductor switching device; an abnormality detection means that detects a fatal abnormality and a precursory abnormality, which occurs prior to the fatal abnormality, in the switching device or the driving means; a protection means that protects the switching device when the abnormality detection means detects an abnormality; and an abnormality output means that outputs a signal based on an abnormality detection signal from the abnormality detection means. The intelligent power module is characterized in that the abnormality output means outputs an abnormality cause discrimination signal, as a serial signal, that indicates the cause of a fatal abnormality or a precursory abnormality. The cause of an abnormality can be discriminated without providing a great number of output terminals; thus, there can be provided an inexpensive intelligent power module.

It is also publicly known that an A/D converter is provided in an intelligent power module. For example, Patent Document 2 [Japanese Patent Application Laid-Open No. H07-115354 (FIG. 1 and ABSTRACT OF THE DISCLOSURE)] discloses an "intelligent power module" in which there are provided a power amplification semiconductor device; a temperature detection device that detects the temperature of the power amplification semiconductor device; and a temperature information output means that outputs temperature information detected by the temperature detection device, as either a continuous signal or a digital signal generated by A/D-converting the continuous signal. The intelligent power module is characterized in that, when the intelligent power module is overloaded and the temperature of the power amplification semiconductor device rises, it is made possible to limit the overload imposed the intelligent power module by utilizing temperature information detected by the temperature detection device, before the temperature of the power amplification semiconductor device reaches the point at which the power supply to the power amplification semiconductor device cannot help being turned off, and the intelligent power module can continue to operate with the limited load.

Furthermore, it is also publicly known that an opening/closing control signal, as a serial signal, is transmitted to the intelligent power module. For example, Patent Document 3 [Japanese Patent Application Laid-Open No. H05-262190 (FIG. 1 and ABSTRACT OF THE DISCLOSURE)] discloses a "total control apparatus for an automobile" in which a parallel output signal generated by a control unit in the total control apparatus is converted into a serial signal and transmitted to an intelligent power module, and then the intelligent power module converts the serial signal into a parallel signal so as to drive a plurality of actuators; thus, there can be provided a total control apparatus in which the number of wiring leads is reduced, the control unit is downsized, and the reliability of the total control is raised.

Meanwhile, Patent Document 4 [Japanese Patent Application Laid-Open No. H08-308238 (Table 1 and Paragraph [0009])] discloses a "PWM signal output apparatus and method" in which the active level width of a PWM signal is converted into the number of clock pulses of logic "1", sent out during one cycle of the PWM signal, so that there is outputted a PWM signal having a desirable duty ratio. Specifically, in the case where there is outputted a PWM signal in which the number of bits per one cycle is 72 and the duty ratio is 30%, 30% of 72 bits are set to "1" and the rest of them are set to "0".

Furthermore, in Non-Patent Document 1 [Data Sheet of "TLE6220GP-type smart switch" manufactured by Infineon] that discloses a "TLE6220GP-type smart switch", there is described the specification of a semiconductor product that includes four opening/closing devices, an abnormality detection circuit, an excessive-current protection circuit, and a serial-parallel converter and that can perform opening/closing control of the opening/closing devices by utilizing a serial control signal or a parallel control signal; it is described that the parallel control signal is applied to pulse-width modulation control; and it is described that disconnection/shortcircuit abnormality information on the opening/closing device can be monitored through the serial-parallel converter.

In the "intelligent power module" disclosed in Patent Document 1, the respective cause-discriminated abnormality occurrence statuses of the plurality of switching devices can be read through a serial signal and hence the number of input signals of, for example, a microprocessor that is concurrently utilized can be suppressed; however, because it is required to supply a control signal to each opening/closing device, there is posed a drawback that the number of the outputs of the concurrently utilized microprocessor cannot be suppressed, even in the case of a simple application where part or all of the opening/closing devices perform opening/closing operation at low frequency.

In the "intelligent power module" disclosed in Patent Document 2, temperature information on the opening/closing device can be read by, for example, a concurrently utilized microprocessor; however, there is posed a drawback that, when an A/D converter is provided in the intelligent power module, the number of input terminals of the microprocessor is increased due to reading of the digital value of the temperature information.

Furthermore, in the "total control apparatus for an automobile" disclosed in Patent Document 3, even though the number of the wire leads for opening/closing signals can be reduced in an application where a great number of opening/closing devices are simply opening/closing-controlled; however, in the case of an opening/closing device that needs to perform high-speed operation such as pulse-width modulation control and pulse output control, there is posed a problem that the responsiveness to a serial signal is insufficient.

In addition, in the "PWM signal output apparatus and method" disclosed in Patent Document 4, it is proposed that pulse-width modulation control be performed through a serial signal; however, in this case, there is posed a problem that the number of signal wire leads cannot be reduced because serial signal lines are required, and there is also posed a drawback that, because ON period or OFF period concentrates in the ON/OFF control period, the fluctuation in the load current becomes large.

In the "smart switch" disclosed in Non-Patent Document 1, as the control signal for the opening/closing device, a serial control signal or a parallel control signal can selectively be utilized, and overheating can be prevented by an excessive-current protection circuit in which the rated current of the opening/closing device is adopted as a reference; however, because there is provided no function for monitoring a detected load current through A/D converter, there is posed a drawback that overload detection where the rated current of an applied load is utilized as a reference cannot be performed. Moreover, there is posed a problem that, in the case where pulse-width modulation control is performed through a parallel control signal, the digitally converted value cannot simply be read as a serial signal, even if an A/D converter is incorporated therein.

SUMMARY OF THE INVENTION

The objective of the present invention is to provide an intelligent power module, to be applied to a multi-purpose electronic control apparatus, in which an intelligent power module including a plurality of opening/closing devices and a microprocessor are connected in series with each other so that the number of the input signal lines and the number of the output signal lines of the microprocessor are reduced.

A subsidiary objective of the present invention is to provide an intelligent power module configured in such a way that pulse-width modulation control and variable-period pulse output control can be performed by use of an intelligent power module. Another subsidiary objective of the present invention is to make it possible for a microprocessor to readily read data digitally converted by a multi-channel A/D converter and stored in an intelligent power module.

An electronic control apparatus according to the present invention is provided with a plurality of opening/closing devices that are supplied with electric power from an external power source and perform energization drive of a plurality of electric loads corresponding to channel numbers; an intelligent power module in which there are integrated an abnormality detection circuit and at least one of an excess current cutoff circuit and an overheat shutoff circuit for the opening/closing device; and a microprocessor connected mutually in series with the intelligent power module by the intermediary of a serial-parallel converter. The electronic control apparatus is characterized in that the intelligent power module further includes a second multi-channel A/D converter and respective selection circuits for the opening/closing devices, in that the selection circuit performs circuit-closing drive or circuit-opening cutoff of the opening/closing device, by utilizing at least one of or both a serial control signal that is received from the microprocessor by way of the serial-parallel converter and stored in an updating manner in a buffer memory and a parallel control signal that is directly inputted thereto from the microprocessor without passing through the serial-parallel converter; in addition to that, in the case where no parallel control signal circuit is connected between the microprocessor and the intelligent power module, the selection circuit can determine the opening/closing state of the opening/closing device, based on the logic status of the serial control signal, in that the abnormality detection circuit generates an abnormality determination signal, obtained by comparing the opening/closing state of the opening/closing device with the logic status of the serial control signal or the parallel control signal selected by the selection circuit, or a status detection signal required to perform an abnormality determination; and the abnormality determination signal or the status detection signal is transmitted in series to the microprocessor by way of the serial-parallel converter, in that the second multi-channel A/D converter converts analogue detection signals related to conduction currents of part or all of the opening/closing devices into digital values; and the digital conversion data is transmitted to the microprocessor by way of the serial-parallel converter, and in that, in response to an input signal inputted from an input sensor, the detection signal of the abnormality detection circuit, and the contents of a control program stored in a program memory, the microprocessor opening/closing-controls the plurality of opening/closing devices, by means of the serial control signal or the parallel control signal, so as to control energization drive of the plurality of electric loads; and the intelligent power module adjusts the reading timing in such a way that, regardless of the kind of the control signal, the digital conversion data is always read during the period in which the opening/closing device is driven to be closed.

In an electronic control apparatus according to the present invention, an intelligent power module including a plurality of opening/closing devices is opening/closing-controlled through a serial control signal transmitted from a microprocessor by way of a serial-parallel converter or a parallel control signal inputted thereto without passing through the serial-parallel converter; it is determined by a selection circuit provided for each opening/closing device whether the control is performed through the serial control signal or through the parallel control signal; the conduction current of the opening/closing device is transmitted, as digital conversion date obtained through a multi-channel A/D converter, to the microprocessor; and the IPM adjusts the reading timing in such a way that, regardless of the kind of the control signal, the digital conversion data is read always during the period in which the opening/closing device is driven to be closed. Therefore, there are demonstrated effects in which a common-use opening/closing device, for which response delay due to serial communication control hardly counts, is controlled through the serial control signal, whereby the number of control outputs of the microprocessor can be suppressed; in the case of a special load that requires high-level control such as pulse-width modulation control in which the pulse period is constant and the proportion (duty) of the pulse ON time to the ON-and-OFF period is variable or variable-period pulse output control in which the pulse period is variable and the proportion (duty) of the pulse ON time to the ON-and-OFF period is constant (50%), it is made possible that, without providing an external signal switching/selecting circuit, the IPM can deal with the high-level control by use of the parallel control signal; and the microprocessor can readily perform reading of A/D conversion data obtained through the multi-channel A/D converter.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIGS. 3A through 3D are a set of explanatory tables each representing the structure of communication data in an electronic control apparatus according to Embodiment 1 of the present invention;

FIG. 4 is a timing chart representing AD conversion processing in an electronic control apparatus according to Embodiment 1 of the present invention;

FIG. 12 is a list representing the contents of a data map in an electronic control apparatus according to Embodiment 2 of the present invention;

DETAILED DESCRIPTION OF THE PREFERRED EMBODIMENTS

Embodiment 1
(1) Detailed Description of Configuration

Figure 1:
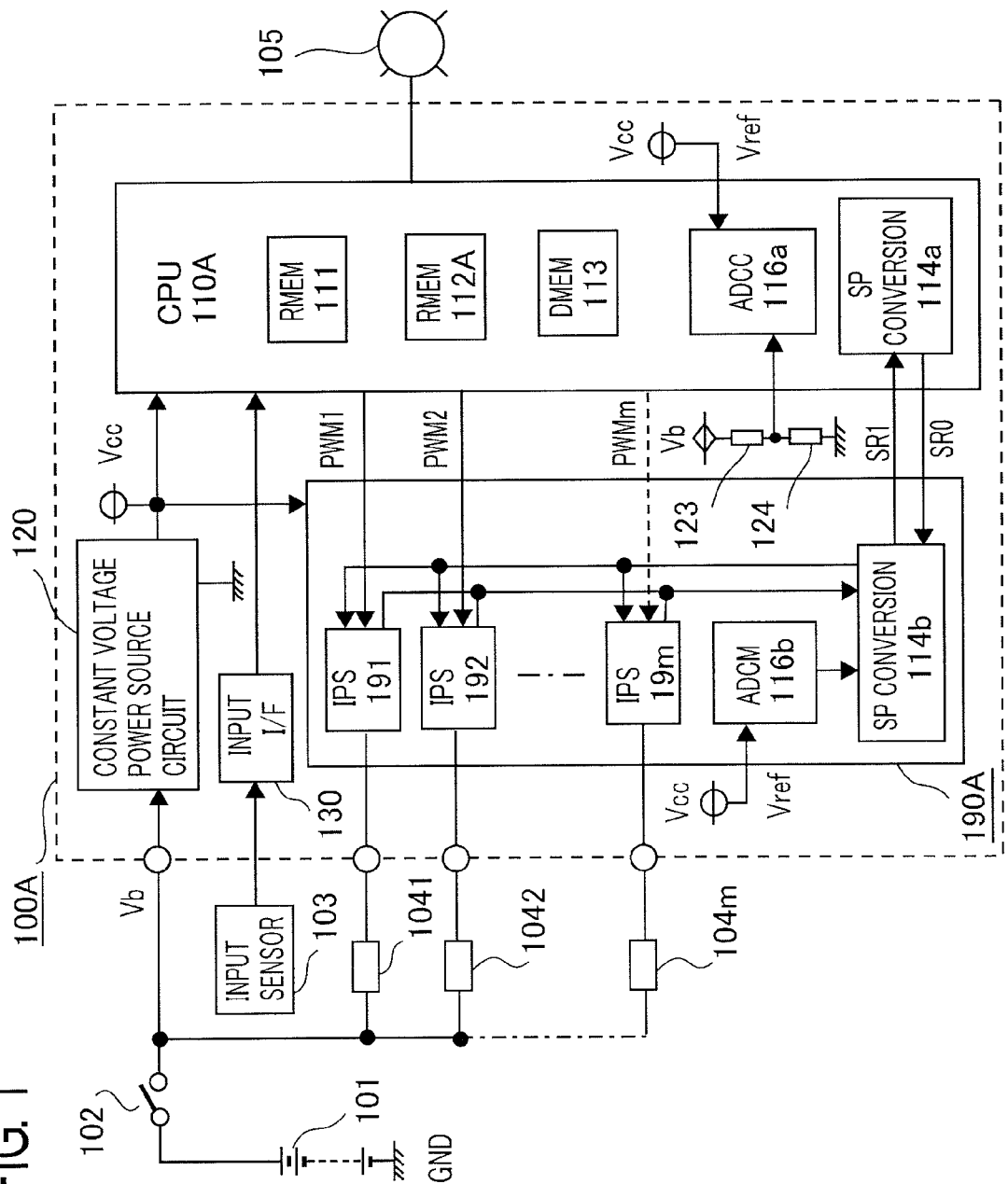
FIG. 1 is a block diagram illustrating the overall configuration of an electronic control apparatus according to Embodiment 1 of the present invention.
Figure 2:
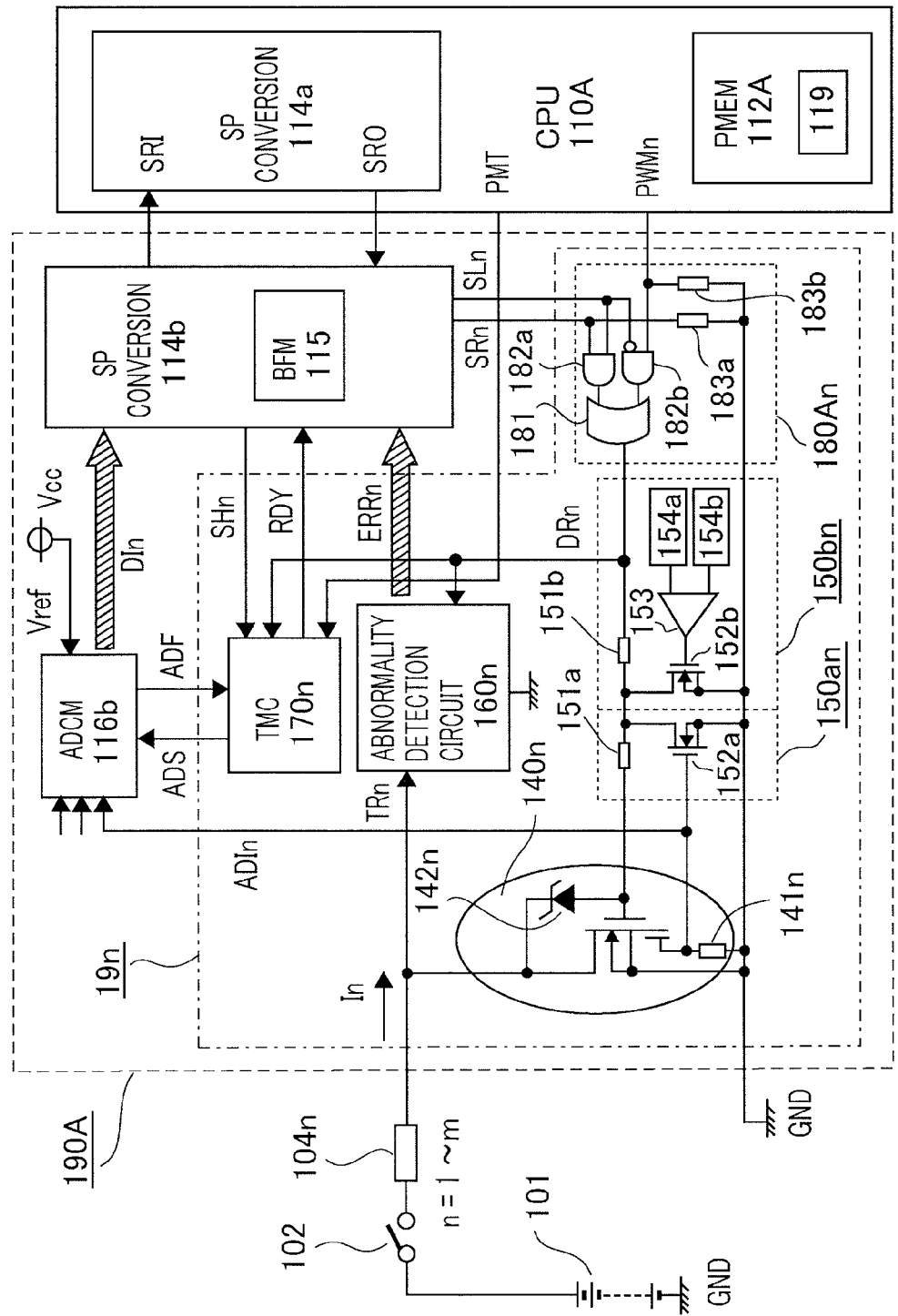
FIG. 2 is a block diagram illustrating the detail of an intelligent power module in an electronic control apparatus according to Embodiment 1 of the present invention.

At first, there will be explained the configuration of an electronic control apparatus according to Embodiment 1 of the present invention. FIG. 1 is a block diagram illustrating the overall configuration of an electronic control apparatus according to Embodiment 1 of the present invention; FIG. 2 is a block diagram illustrating the detail of an intelligent power module in an electronic control apparatus according to Embodiment 1 of the present invention. In FIG. 1, an electronic control apparatus 100A is configured mainly with a microprocessor 110A, an intelligent power module (referred to as an IPM, hereinafter) 190A, a constant voltage power source circuit 120, and an input interface circuit 130.

The electronic control apparatus 100A receives electric power from an external power source 101, which is, for example, a vehicle battery, by way of a power switch 102, and supplies a power-source voltage Vb to the constant voltage power source circuit 120. The constant voltage power source circuit 120 generates a stabilized control voltage Vcc, which is, for example, DC 5V, and supplies it to the microprocessor 110A. The output signals of a plurality of input sensors 103 provided outside the electronic control apparatus 100A are inputted to the microprocessor 110A by way of the input interface circuit 130.

The positive terminals of a plurality of electric loads 1041, 1042, - - -, 104m (in FIG. 2, these electric loads are represented as 104n (n=1, - - -, m)) are connected with the external power source 101 by way of the power switch 102; the negative terminals thereof are connected with the ground GND, which is the negative terminal of the external power source 101, when a plurality of intelligent power switches (referred to as IPSs, hereinafter) 191, 192, - - -, 19m (in FIG. 2, these IPSs are represented as 19n (n=1, - - -, m)) are driven to close.

The microprocessor 110A includes a volatile RAM memory 111, a nonvolatile program memory 112A, a nonvolatile data memory 113, a serial-parallel converter 114a, and a first multi-channel A/D converter 116a; a downlink serial sending signal SRO and an uplink serial returning signal SRI are mutually transmitted and received between the serial-parallel converter 114a, which serves as a principal apparatus, and a serial-parallel converter 114b, which is provided in the IPM 190A and serves as a terminal apparatus. To the analogue input terminal of the first multi-channel A/D converter 116a that operates through the stabilized control voltage Vcc as a reference voltage Vref, there is inputted a voltage that is obtained by dividing a power-source voltage Vb through division resistors 123 and 124 and proportional to the power-source voltage Vb; the voltage division ratio created by the division resistors 123 and 124 is set in such a way that the divided voltage becomes the same as or lower than the reference voltage Vref (=Vcc) when the power-source voltage Vb fluctuates to become maxima. Additionally, an analogue signal, the output signal of an analogue sensor, which is one of the input sensors 103, is inputted to the first multi-channel A/D converter 116a.

The IPM 190A is provided with, for example, 14 IPSs 191, 192, - - -, 19m (m=14), and performs serial communication with the serial-parallel converter 114a in the microprocessor 110A by the intermediary of the serial-parallel converter 114b; the IPM 190A also incorporates a second multi-channel A/D converter 116b that operates through the stabilized control voltage Vcc as the reference voltage Vref. All or part of the parallel control signals PWM1 through PWMm can be connected with the IPSs 191 through 19m; the IPSs, among the IPSs 191 through 19m, which are not connected with the parallel control signals PWM1 through PWMm can perform opening/closing control by means of a serial control signal transmitted from the serial-parallel converters 114a and 114b. Additionally, when the microprocessor 110A becomes abnormal or when the IPS 190A transmits an abnormality detection signal, an alarm display 105 operates.

The parallel control signals PWM1 through PWMm in Embodiment 1 are pulse-width modulation signals; the pulse duty, which is the proportion of the ON time of a pulse signal to a constant ON-and-OFF period, is variable, and ON/OFF operation is performed at a frequency faster than the serial communication frequency.

In FIG. 2 that illustrates the detail of the IPS19n for driving and controlling the electric load 104n (n=1 through m), as an opening/closing device 140n (n=1 through m, the same applies hereinafter), a power transistor, which is an N-MOS field-effect transistor, is utilized; the power transistor is connected at the downstream side of the electric load 104n. A current detection resistor 141n connected with a current mirror circuit is connected with the negative terminal of the driving power source 101, which is the ground GND, along with the source terminal.

An overvoltage suppression diode 142$n$ is a constant voltage diode connected between the drain and the gate of the opening/closing device 140$n$; a load current that has been flowing in the opening/closing device 140$n$ while the opening/closing device 140$n$ is closed is rapidly attenuated by the overvoltage suppression diode 142$n$ when the opening/closing device 140$n$ is opened; the open-circuit surge voltage in this situation is limited by the constant voltage characteristics of the overvoltage suppression diode 142$n$. A current cutoff circuit 150$an$ is configured with a first driving resistor 151$a$ and a conduction control transistor 152$a$, which is an N-MOS field-effect transistor; the drain terminal of the conduction control transistor 152$a$ is connected with the connection point between the first driving resistor 151$a$ and a second driving resistor 151$b$ that are connected in series between the gate terminal of the opening/closing device 140$n$ and the output terminal of a selection circuit 180An; the source terminal of the conduction control transistor 152$a$ is connected with the grand GND; the gate terminal thereof is connected with the current detection resistor 141$n$.

For the purpose of preventing the load current that flows in the opening/closing device 140$n$ from becoming the same as or larger than a limit threshold value current Ic, which is a value larger than a predetermined reference current Ir corresponding to the rated current of the opening/closing device 140$n$, the excess current cutoff circuit 150$an$ collaborates with the conduction control transistor 152$a$ that responds to the voltage across the current detection resistor 141$n$, in order to form a negative feedback control circuit and to control the conduction condition of the opening/closing device 140$n$ so as to maintain the voltage across the opening/closing device 140$n$ to be the same as or higher than a predetermined logic determination voltage, when a shortcircuit abnormality is caused in the electric load 104$n$.

The current detection resistor 141$n$ is connected in series with the current mirror circuit in which a minute current, which is proportional to the drain current of the opening/closing device 140$n$, flows; the current detection resistor 141$n$ is adapted to generate a first both-end voltage E1 (=R141×Ir/α) while the reference current Ir flows in the opening/closing device 140$n$ and to generate a second both-end voltage E2 (=R141×Ic/α) while the limit threshold value current Ic flows in the opening/closing device 140$n$. Here, R141 denotes the resistance value of the current detection resistor 141$n$, and α is a current mirror ratio; the first both-end voltage E1 is set to a value that is the same as or lower than the gate-off voltage Eoff (e.g., DC 2 V) of the conduction control transistor 152$a$; the second both-end voltage E2 is set to a value that is the same as or higher than the gate-on voltage Eon (e.g., DC 4 V) of the conduction control transistor 152$a$.

When the gate voltage of the conduction control transistor 152$a$ becomes the same as or lower than the gate-off voltage Eoff, the conduction control transistor 152$a$ is completely opened; when the gate voltage of the conduction control transistor 152$a$ becomes the same as or higher than the gate-on voltage Eon, the conduction control transistor 152$a$ becomes completely conductive; the relationship among the respective voltages is E1≦Eoff≦Eon≦E2. An overheat shutoff circuit 150$bn$ is configured mainly with a cutoff control transistor 152$b$, which is an N-MOS field-effect transistor, a comparison amplifier 153, and a temperature sensor 154$a$; the drain terminal of the cutoff control transistor 152$b$ is connected with the connection point between the first and second driving resistors 151$a$ and 151$b$; the source terminal thereof is connected with the grand GND; the gate terminal thereof is connected with the output terminal of the comparison amplifier 153. A comparison reference voltage 154$b$ is applied to the inversion input terminal of the comparison amplifier 153, and the non-inversion input terminal thereof is connected with the temperature sensor 154$a$.

The temperature sensor 154$a$ detects the ambient temperature of the opening/closing device 140$n$; when, as the temperature rises, the electric potential of the non-inversion input terminal of the comparison amplifier 153 increases and then exceeds the value of the comparison reference voltage 154$b$ applied to the inversion input terminal, the output logic of the comparison amplifier 153 becomes high-level and hence the cutoff control transistor 152$b$ is closed. As a result, the opening/closing device 140$n$ is opened.

When the output logic of the comparison amplifier 153 becomes high-level, the voltage of the non-inversion input terminal thereof increases through an unillustrated positive feedback resistor, whereby the output logic of the comparison amplifier 153 is maintained to be high-level. An abnormality detection circuit 160$n$ generates an open-circuit normality detection signal, in the case where, when the signal voltage level of a driving command signal DRn, which is the output signal of the selection circuit 180An, is "L" (logic "0"), the opening/closing device 140$n$ is normally opened and the signal voltage level of the voltage TRn across the opening/closing device 140$n$ is "H" (logic "1").

However, the abnormality detection circuit 160$n$ generates an open-circuit abnormality detection signal when, for example, due to a short-circuit abnormality in the opening/closing device 140$n$, the signal voltage level of the voltage TRn across the opening/closing device 140$n$ becomes "L" (logic "0"). The abnormality detection circuit 160$n$ generates an closed-circuit normality detection signal, in the case where, when the signal voltage level of the driving command signal DRn is "H" (logic "1"), the opening/closing device 140$n$ is normally closed and the signal voltage level of the voltage TRn across the opening/closing device 140$n$ is "L" (logic "0").

However, when, for example, the excess current cutoff circuit 150$an$ or the overheat shutoff circuit 150$bn$ is activated and hence the opening/closing device 140$n$ is cut off, the signal voltage level of the signal voltage level of the voltage TRn across the opening/closing device 140$n$ becomes "H" (logic "1"), and the abnormality detection circuit 160$n$ generates an closed-circuit abnormality detection signal. A circuit (unillustrated) for detecting disconnection of or a short-circuit abnormality in the electric load 104$n$ is also added to the abnormality detection circuit 160$n$; the abnormality detection circuit 160$n$ generates various detection statuses, as 4-bit abnormality detection data ERRn, for example.

The second multi-channel A/D converter 116$b$ converts an analogue detection signal ADIn, which is the voltage across the current detection resistor 141$n$, into, for example, 12-bit digital conversion data DIn. As the actual analogue detection signal ADIn, there is utilized, as described later with reference to FIG. 14, the output signal, of an unillustrated current detection circuit 144$n$, which is obtained by amplifying the voltage across a high-accuracy current detection resistor 143$n$ connected between the source terminal of the opening/closing device 140$n$ and the ground GND; as describes above, limitation may be made in such a way that only part of opening/closing devices 140$n$ can perform accurate current detection.

As describe later with reference to FIG. 4, a reading timing control circuit 170$n$ issues an A/D conversion command ADS to the second multi-channel A/D converter 116$b$, based on a sampling hold command SHn transmitted from the microprocessor 110A, and then generates a reading permission signal RDY, based on an A/D conversion completion signal ADF generated by the second multi-channel A/D converter 116b. When the microprocessor 110A completes reading of the digital conversion data DIn, the sampling hold command SHn is cancelled, whereby the digital conversion data DIn of the second multi-channel A/D converter 116b is reset.

The selection circuit 180An is configured with a logical sum element 181, first and second gate elements 182a and 182b, and first and second pull-down resistors 183a and 183b; the respective outputs of the first and second gate elements 182a and 182b are inputted to the logical sum element 181. A parallel control signal PWMn directly inputted to the microprocessor 110A is inputted to the second gate element 182b and connected with the ground GND through the second pull-down resistor 183b.

A serial control signal SRn transmitted through the serial-parallel converters 114a and 114b from the microprocessor 110A and stored in the buffer memory 115 is inputted to the first gate element 182a and connected with the ground GND through the first pull-down resistor 183a. At least when starting its operation, the microprocessor 110A transmits selection command data 119 preliminarily stored in the program memory 112A to the buffer memory 115 through the serial-parallel converters 114a and 114b; the buffer memory 115 generates a selection command signal SLn, based on the selection command data 119 stored therein, so as to selectively switch the first and second gate circuits 182a and 182b.

In the case where the selection command signal SLn is logic "1", the serial signal SRn is effectively selected; in the case where the selection command signal SLn is logic "0", the parallel signal PWMn is effectively selected.

Figure 3C:
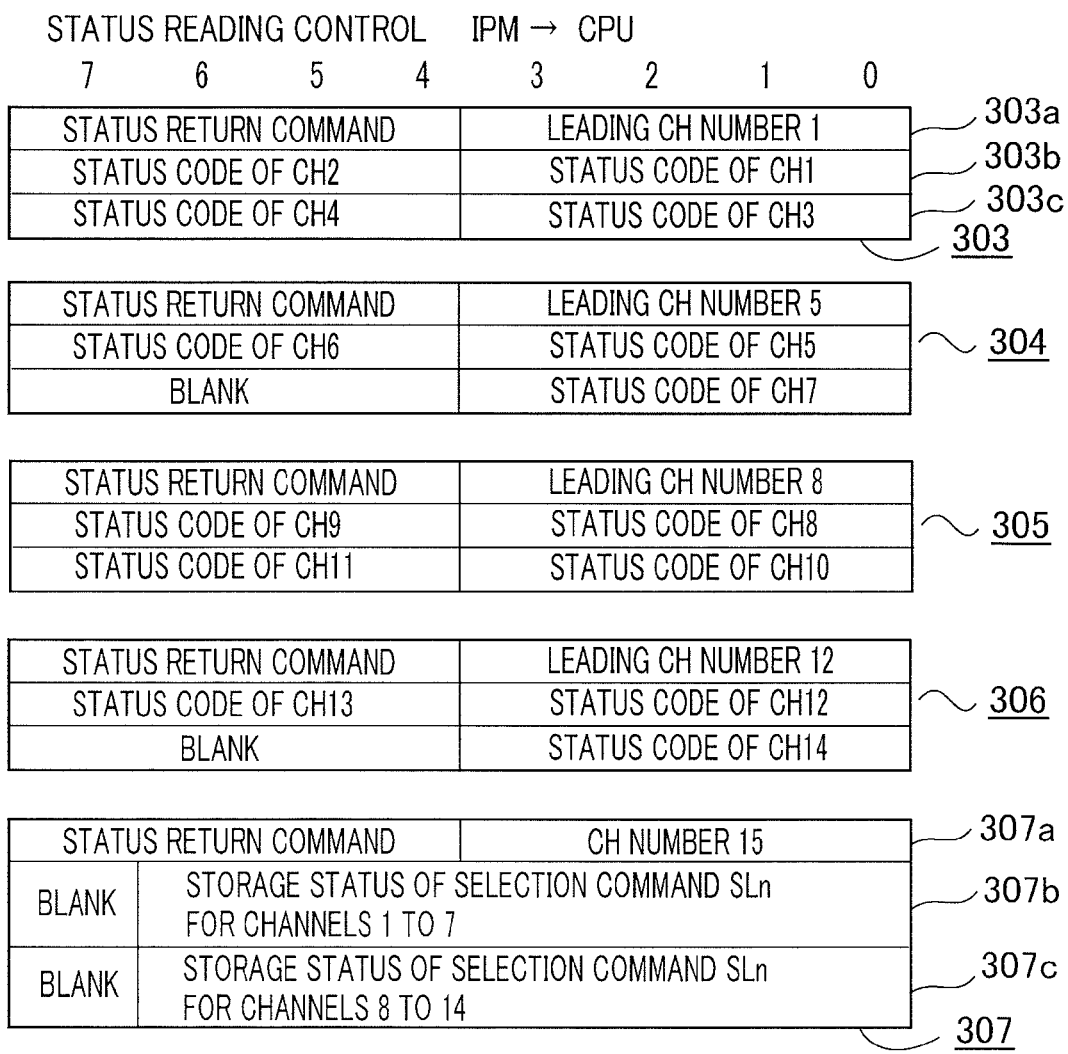
Figure 3D:
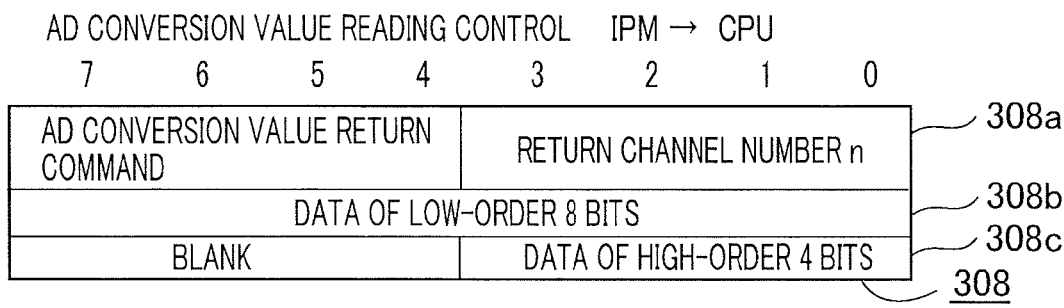

Next, there will be explained the configuration of the electronic control apparatus according to Embodiment 1 of the present invention. FIGS. 3A through 3D are a set of explanatory tables each representing the structure of communication data in the electronic control apparatus according to Embodiment 1 of the present invention; FIG. 3A represents the structure of communication data at a timing of initial setting; FIG. 3B represents the structure of communication data at a timing of writing control; FIG. 3C represents the structure of communication data at a timing of reading control; FIG. 3D represents the structure of communication data at a timing of A/D conversion value reading control.

In FIG. 3A, a transmission package 301 to be transmitted from the microprocessor 110A to the IPM 190A is configured with first, second, and third 8-bit frames 301a, 301b, and 301c; in 4 high-order bits in the first frame 301a, a predetermined code, which serves as an initial setting command, is written; 4 low-order bits are blank.

The selection command data 119 corresponding to the channel number n (=1 through 7) in the program memory 112A is written in the second frame 301b by way of the microprocessor 110A. The selection command signal SLn, for the channel number n, in which logic "1" is written in the second frame 301b becomes logic "1"; in the selection circuit 180An, the first gate 182a becomes effective; then, as the driving command signal DRn, the serial control signal SRn is selected.

The selection command signal SLn, for the channel number n, in which logic "0" is written in the second frame 301b becomes logic "0"; in the selection circuit 180An, the second gate 182b becomes effective; then, as the driving command signal DRn, the parallel control signal PWMn is selected. Similarly, the selection command data 119 corresponding to the channel number n (=8 through 14) in the program memory 112A is written in the third frame 301c by way of the microprocessor 110A; the driving command signal DRn for the channel n is selected by the selection circuit 180An.

The transmission package 301 is transmitted to the IPM 190A at least when the operation starts; however, it may be allowed that, also during the operation, the transmission package 301 is periodically transmitted for the purpose of acknowledgement. The respective most significant bits of the second frame 301b and the third frame 301c are blank.

In FIG. 3B, a transmission package 302 to be transmitted from the microprocessor 110A to the IPM 190A is configured with first, second, and third 8-bit frames 302a, 302b, and 302c; in 4 high-order bits in the first frame 302a, a predetermined code, which serves as a writing command, is written; in 4 lower-order bits, one of channel numbers n (=1 through 14), of the opening/closing device 140n, which is designated by the most significant bit of the second frame 301b or the third frame 302c is written.

The serial control signal SRn corresponding to the channel number n (=1 through 7) is written in the second frame 302b by way of the microprocessor 110A. The serial control signal SRn, for the channel number n, in which logic "1" is written in the second frame 302b becomes logic "1"; when, in the selection circuit 180An, the first gate 182a is effective, the driving command signal DRn becomes logic "1". The serial control signal SRn, for the channel number n, in which logic "0" is written in the second frame 302b becomes logic "0"; when, in the selection circuit 180An, the first gate 182a is effective, the driving command signal DRn becomes logic "0".

Similarly, the serial control signal SRn corresponding to the channel number n (=8 through 14) in the program memory 112A is written in the third frame 302c by way of the microprocessor 110A; the driving command signal DRn for the channel n is selected by the selection circuit 180An.

The transmission package 302 is always transmitted to the IPM 190A while the microprocessor 110A operates.

The most significant bit of the second frame 302b is the sampling hold command SHn for one of the channel numbers n (=1 through 14), which is designated by the first frame 302a. When the logic of the most significant bit is set to "1", A/D conversion is started; then, when the microprocessor 110A receives a conversion value reading package 308, described later, the sampling hold command SHn is cancelled to become logic "0".

Furthermore, the most significant bit of the third frame 302c is the selection command signal SLn for one of the channel numbers n (=1 through 14), which is designated by the first frame 302a. The selection command signal SLn is a discrete acknowledgement command for the selection command signals SLn transmitted all together with the transmission package 301. When there is issued a command that is different in logic from the selection command signals SLn transmitted all together with the transmission package 301, the selection command is changed during the operation.

In contrast, in the case where the channel number designated by 4 lower-order bits of the first frame 302a is "0" or "15", the sampling hold command SHn and the selection command signal SLn expressed by the respective most significant bits of the second frame 302b and the third frame 302c are ineffective; however, the serial control signal SRn is effective. In particular, in the case where the channel number designated by 4 lower-order bits of the first frame 302a is "15", the serial control signal SRn serves also as a reading command for the selection command signal SLn already stored in the IPM 190A.

In FIG. 3C, a return package 303 to be transmitted from the IPM 190A to the microprocessor 110A is configured with first, second, and third 8-bit frames 303a, 303b, and 303c; in 4 high-order bits in the first frame 303a, a predetermined code, which serves as a status return command, is written; in 4 low-order bits, the leading channel number of return data is written.

In 4 low-order bits of the second frame 303b, the abnormality detection data ERRn for the first-channel (n=1) opening/closing device 140n is written; in 4 high-order bits, the abnormality detection data ERRn for the second-channel (n=2) opening/closing device 140n is written. In 4 low-order bits of the third frame 303c, the abnormality detection data ERRn for the third-channel (n=3) opening/closing device 140n is written; in 4 high-order bits, the abnormality detection data ERRn for the fourth-channel (n=4) opening/closing device 140n is written. Similarly, in the case of a return package 304, the abnormality detection data ERRn for the fifth-channel to the seventh-channel (n=5 through 7) opening/closing devices 140n are written; 4 high-order bits of the third frame 304c are blank.

In return packages 305 and 306, the abnormality detection data ERRn for the eighth-channel to the fourteenth-channel (n=through 14) opening/closing devices 140n are written. The return packages 303 through 306 are sequentially transmitted; through four transmissions, a series of abnormality detection data ERR1 through ERRm are transmitted; during the operation, a series of transmissions are repeatedly performed. A return package 307 is adapted when a reading command for the selection command signal SLn is issued through the transmission package 302. In 4 low-order bits of the first frame 307a, the channel number 15 is written; the storage logics of the present selection command signals SLn corresponding to the channel 1 through 7 are written in the second frame 307b; the storage logics of the present selection command signals SLn corresponding to the channel 8 through 14 are written in the third frame 307c; then, a report is transmitted.

In FIG. 3D, the return package 308 to be transmitted from the IPM 190A to the microprocessor 110A is configured with first, second, and third 8-bit frames 308a, 308b, and 308c; in 4 high-order bits in the first frame 308a, a predetermined code, which serves as an A/D conversion value return command, is written; in 4 high-order bits, the leading channel number of return data is written. In the second frame 308b, the data in 8 low-order bits of the A/D conversion data DIn is written.

In 4 low-order bits of the third frame 308c, the data in 4 high-order bits of the A/D conversion data DIn is written; 4 high-order bits of the third frame 308c are blank. The return package 308 is created when the reading timing control circuit 170n generates the reading permission signal RDY; the return package 308 is transmitted to the microprocessor 110A in such a way as to cut into the status return packages 303 through 306. For example, when the reading permission signal RDY is generated while the status return package 303 is transmitted, the return package 308 becomes the following transmission package when the transmission of the status return package 303 is completed; when the transmission of the return package is completed, the return package 304 becomes the following transmission package.

(2) Detailed Description of Operation

Next, there will be explained the operation of the electronic control apparatus according to Embodiment 1 of the present invention. Firstly, in FIGS. 1 and 2, when the power switch 102 is closed and the power-source voltage Vb is applied to the electronic control apparatus 100A, the constant voltage power source circuit 120 generates the predetermined stabilized control voltage Vcc so as to supply electric power to the microprocessor 110A. The microprocessor 110A drives and controls the electric load 104n (n=1 through m) in accordance with the operation status of the input sensor 103 and the contents of the control program stored in the program memory 112A. The driving command signal DRn for the electric load 104n is the serial control signal SRn transmitted to the IPM 190A through the serial-parallel converters 114a and 114b or a parallel control signal PRn (in Embodiment 1, the pulse-width modulation signal PWMn) issued from the microprocessor 110A directly to part of the electric loads 104n; the selection circuit 180An performs selection between the serial control signal SRn and the parallel control signal PRn.

The abnormality detection data ERRn based on the opening/closing status of the opening/closing device 140n and the digital conversion value DIn of the conduction current (load current) In of the opening/closing device 140n are transmitted to the microprocessor 110A through the serial-parallel converters 114a and 114b; based on these monitoring information items, a circuit-closing drive command to the opening/closing device 140n is cancelled or the abnormality is alarmed by the alarm display 105.

Next, AD conversion processing in FIG. 1 will be explained. FIG. 4 is a timing chart representing AD conversion processing in the electronic control apparatus according to Embodiment 1 of the present invention. FIG. 4(A) is the waveform of the driving command signal DRn, which is the output of the selection circuit 180An, in the case where the pulse-width modulation signal PWMn, as a parallel control signal, is supplied to the opening/closing device 140n; the ON duty, which is the time proportion of ON period to a constant period T, can variably be adjusted.

FIG. 4(B) is the waveform of the analogue detection signal ADIn that is proportional to the load current In detected by the current detection circuit 144n (refer to FIG. 14); the waveform is a gradually-increasing and gradually-decreasing waveform that changes delayed with respect to the waveform represented in FIG. 4(A), due to the effects of the inductance component included in the electric load 104n and the noise-absorbing filter circuit included in the current detection circuit 144n.

FIG. 4(C1) is the waveform of the sampling hold command SHn stored, as the transmission package 302, in the buffer memory 115 of the IPM 190A; the dotted-line starting portion thereof represents a case where the sampling hold command SHn is issued during the OFF command period of the pulse-width modulation signal PWMn, and the solid-line starting portion thereof represents a case where the sampling hold command SHn is issued immediately after the ON command period of the pulse-width modulation signal PWMn starts.

FIG. 4(D1) is the waveform representing the operation status of the multi-channel A/D converter 116b that responds to the sampling hold command SHn represented in FIG. 4(C1); the A/D conversion command ADS to be generated by the reading timing control circuit 170n is generated when a predetermined acknowledgement waiting time T1 elapses after the pulse-width modulation signal PWMn turns ON. During the acknowledgement waiting time T1, the analogue detection signal ADIn represented in FIG. 4(B) completely rises. The A/D conversion start command ADS is reset by the A/D conversion completion signal ADF generated by the second multi-channel A/D converter 116b or it is reset when a predetermined time necessary for A/D conversion elapses.

The waveform in FIG. 4(E1) represents the status of a serial signal transmitted from the serial-parallel converter 114b to the serial-parallel converter 114a. In FIG. 4(D1), when the A/D conversion completion signal ADF is generated, the reading timing control circuit 170n generates the reading permission signal RDY; the digital conversion data DIn is transmitted as the return package 308; then, the microprocessor 110A receives the digital conversion data DIn and cancels the sampling hold command SHn. As a result, the digital conversion data DIn and the reading permission signal RDY are reset.

FIG. 4(C2) represents the waveform of the sampling hold command SHn in the case where the pulse-width modulation signal PWMn is in the ON command period thereof and the analogue detection signal ADIn has already completed its rising.

FIG. 4(D2) is the waveform representing the operation status of the multi-channel A/D converter 116b that responds to the sampling hold command SHn represented in FIG. 4(C2); the A/D conversion command ADS to be generated by the reading timing control circuit 170n is generated when a predetermined acknowledgement waiting time T2 elapses after the sampling hold command SHn turns ON and the selection of the input channel of the second multi-channel A/D converter 116b is completed. The A/D conversion start command ADS is reset by the A/D conversion completion signal ADF generated by the second multi-channel A/D converter 116b or it is reset when a predetermined time necessary for A/D conversion elapses.

The waveform in FIG. 4(E2) represents the status of a serial signal transmitted from the serial-parallel converter 114b to the serial-parallel converter 114a. In FIG. 4(D2), when the A/D conversion completion signal ADF is generated, the reading timing control circuit 170n generates the reading permission signal RDY; the digital conversion data DIn is transmitted as the return package 308; then, the microprocessor 110A receives the digital conversion data DIn and cancels the sampling hold command SHn. As a result, the digital conversion data DIn and the reading permission signal RDY are reset.

FIG. 4(C3) represents the waveform of the sampling hold command SHn in the case where the pulse-width modulation signal PWMn is in the ON command period thereof and the sampling hold command SHn turns ON immediately before the pulse-width modulation signal PWMn changes to the OFF command.

FIG. 4(D3) is the waveform representing the operation status of the multi-channel A/D converter 116b that responds to the sampling hold command SHn represented in FIG. 4(C3); as is the case with FIG. 4(C2), the A/D conversion command ADS and the A/D conversion signal ADF are generated.

The waveform in FIG. 4(E3) represents the status of a serial signal transmitted from the serial-parallel converter 114b to the serial-parallel converter 114a. In FIG. 4(D3), immediately before or after the A/D conversion completion signal ADF is generated, the pulse-width modulation signal PWMn changes from the ON command to the OFF command; thus, the reading timing control circuit 170n does not generate the reading permission signal RDY. When the pulse-width modulation signal PWMn changes to the ON command again, the reading permission signal RDY is generated, as is the case with FIG. 4(E1); the digital conversion data DIn is transmitted as the return package 308; then, the microprocessor 110A receives the digital conversion data DIn and cancels the sampling hold command SHn. As a result, the digital conversion data DIn and the reading permission signal RDY are reset.

The dotted-line waveform in FIG. 4(E3) represents the reading permission signal RDY that is cancelled because the pulse-width modulation signal PWMn is the OFF command; as a result, it is prevented that the attenuating analogue detection signal ADIn or the analogue detection signal ADIn, which is disconnected and cut off, is digitally converted and transmitted to the microprocessor 110A.

Figure 5A:
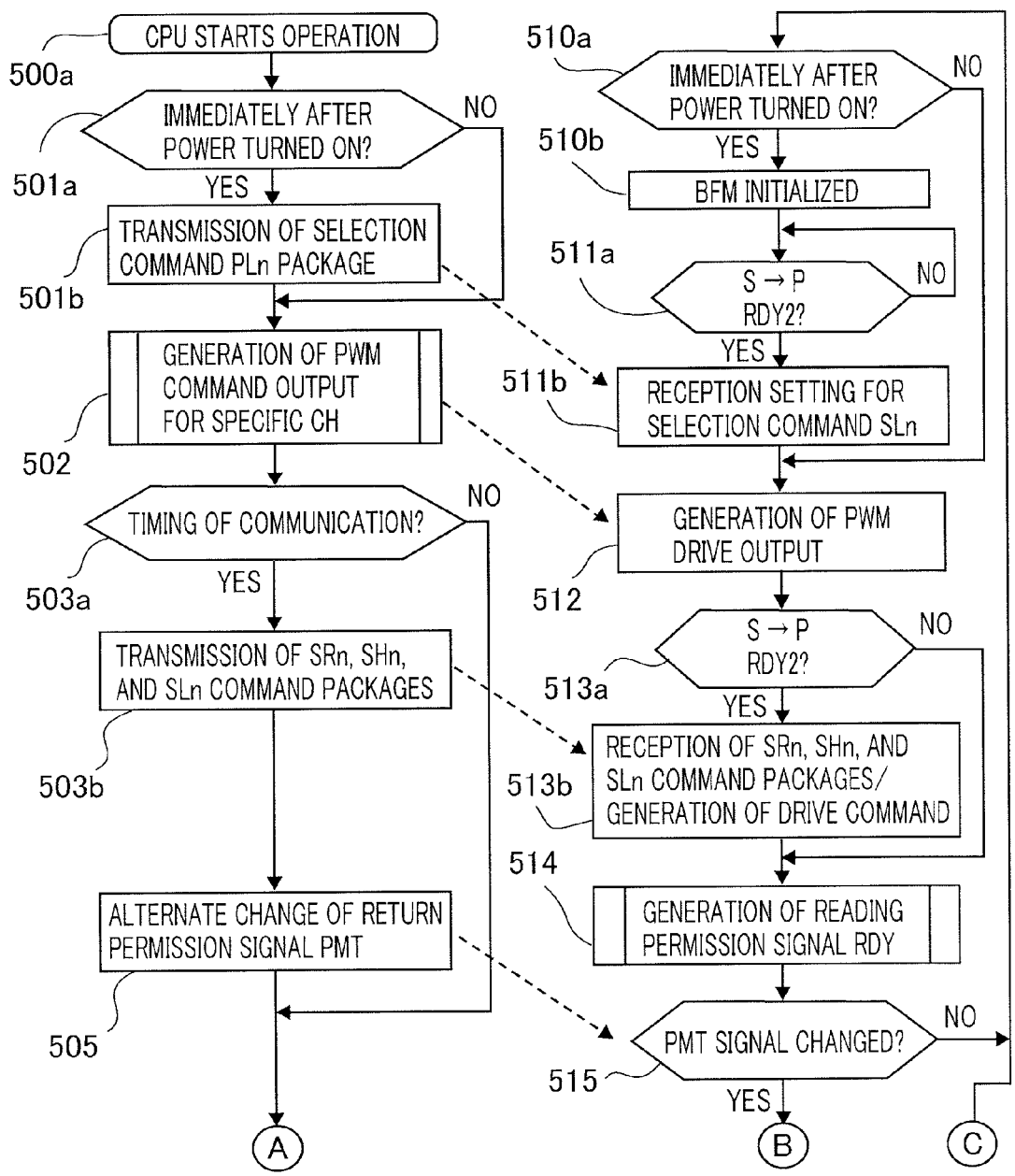
FIGS. 5A and 5B are a set of flowcharts for explaining the operation of an electronic control apparatus according to Embodiment 1 of the present invention.
Figure 5B:
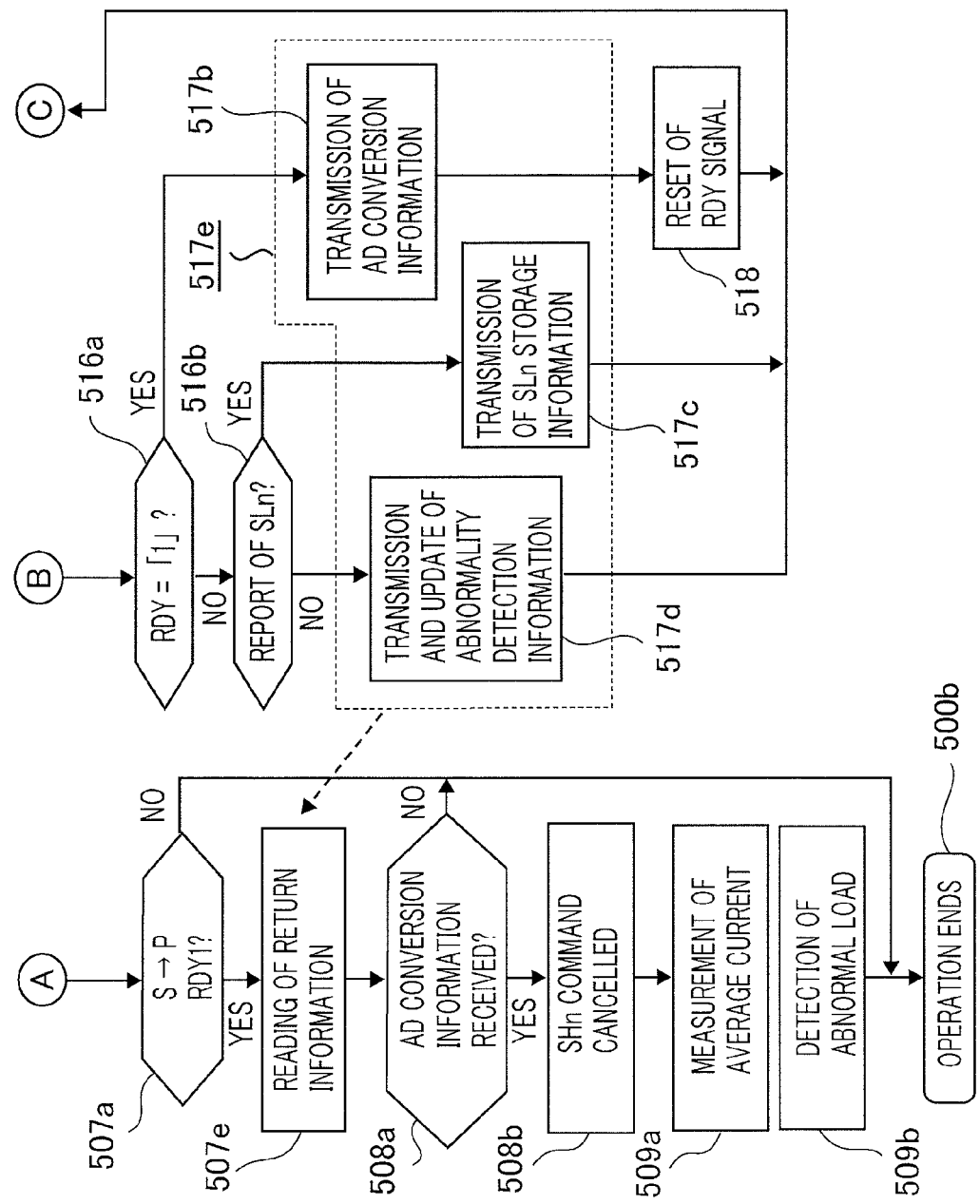

Next, the operation of the electronic control apparatus according to Embodiment 1 of the present invention will be explained with reference to a flowchart. FIGS. 5A and 5B are a set of flowcharts for explaining the operation of the electronic control apparatus according to Embodiment 1 of the present invention. In FIGS. 5A and 5B, a series of steps from 500a through 500b is a flowchart representing control operation performed by the microprocessor 110A, based on the control program stored in the program memory 112A; in contrast, a series of steps from 510a through 518 represented in the right column is an equivalent flowchart for explaining the logic operation performed by the logic circuit in the IPM 190A.

In the left column of the flowchart, the step 500a is the operation start step for the microprocessor 110A. The step 501a is a determination step in which it is determined whether or not the present operation is the first operation after electric power is applied to the microprocessor 110A; in the case where the present operation is the first operation, the result of the determination becomes "YES", and then, the step 501a is followed by the step 501b; in the case where the present operation is operation that is repeated through the operation end step 500b, described later, the result of the determination becomes "NO", and then, the step 501a is followed by the step block 502. In the step 501b, there is issued a transmission command for transmitting the selection command data 119 (refer to FIG. 2) preliminarily stored in the program memory 112A to the IPM 190A through the serial-parallel converters 114a and 114b; then, the step 501b is followed by the step 502.

In the right column of the flowchart, the step 510a is a determination step in which it is determined whether or not the stabilized control voltage Vcc has been applied to the IPM 190A; in the case where the present timing is immediately after the power source turns from OFF to ON, the result of the determination becomes "YES", and then, the step 510a is followed by the step 510b; in the case where the power source has already turned ON and the state is being kept, the result of the determination becomes "NO", and then, the step 510a is followed by the step 512.

In the step 510b, the contents of the buffer memory 115 (refer to FIG. 2) is initialized; then, the step 510b is followed by the step 511a. The step 511a is a determination step in which, for the purpose of determining whether or not the serial-parallel conversion has been completed, there is monitored a ready signal to be generated when the serial-parallel converter 114b completes the serial-parallel conversion; in the case where the conversion has not been completed, the result of the determination becomes "NO", and then, there is resumed the step 511a, where generation of the ready signal is waited; in the case where the conversion has been completed, the result of the determination becomes "YES", and then, the step 511a is followed by the step 511b. In the step 511b, the parallel conversion data of the transmission package 301 (refer to FIG. 3A), for which a command is issued in the step 501b, is stored, as the selection command signal SLn, in the buffer memory 115.

In the step block 502, for the opening/closing device 140n having the channel number for which the parallel control signal PWMn has been selected in the step 501b, a command signal is directly generated without passing through the serial-parallel converters 114a and 114b; accordingly, in the step 512 in the right column, in response to the logic status of the parallel control signal PWMn, which is a direct command signal, the opening/closing device 140n is driven to be closed or opened.

As the parallel control signal PWMn described in Embodiment 1, there is utilized a pulse-width modulation signal that is a pulse train of a constant ON-and-OFF period and whose duty, which is the proportion of the ON period to the constant ON-and-OFF period, can be variably adjusted. The step 503a following the step block 502 is a determination step in which it is determined whether or not the present timing is a timing of communication with the IPM 190A; in the case where the present timing is a timing of communication with the IPM 190A, the result of the determination becomes "YES", and then, the step 503a is followed by the step 503b; in the case where the present timing is not a timing of communication with the IPM 190A, the result of the determination becomes "NO", and then, the step 503a is followed by the step 507a. In the step 503a, the result of the determination becomes "YES" only one time, for example, every 10 msec.

In the step 503b, there is issued a transmission command for transmitting the transmission package 302 (refer to FIG. 3B) configured with the serial control signal SRn, the sampling hold command SHn, and the selection command signal SLn to the IPM 190A through the serial-parallel converters 114a and 114b; then, the step 503b is followed by the step 505. The step 513a is a determination step in which, for the purpose of determining whether or not the serial-parallel conversion has been completed, there is monitored a ready signal to be generated when the serial-parallel converter 114b completes the serial-parallel conversion; in the case where the serial-parallel conversion has not been completed, the result of the determination becomes "NO", and then the step 513a is followed by the step block 514; in the case where the serial-parallel conversion has been completed, the result of the determination becomes "YES", and then, the step 513a is followed by the step 513b.

In the step 513b, the parallel conversion data of the transmission package 302, for which a command is issued in the step 503b, is stored in the buffer memory 115, and in response to the logic status of the received serial control signal SRn, the opening/closing device 140n is driven to be closed or opened. The channel number n, which is a subject of the opening/closing operation, is determined by the contents of the selection command stored in the step 511b.

Figure 6:
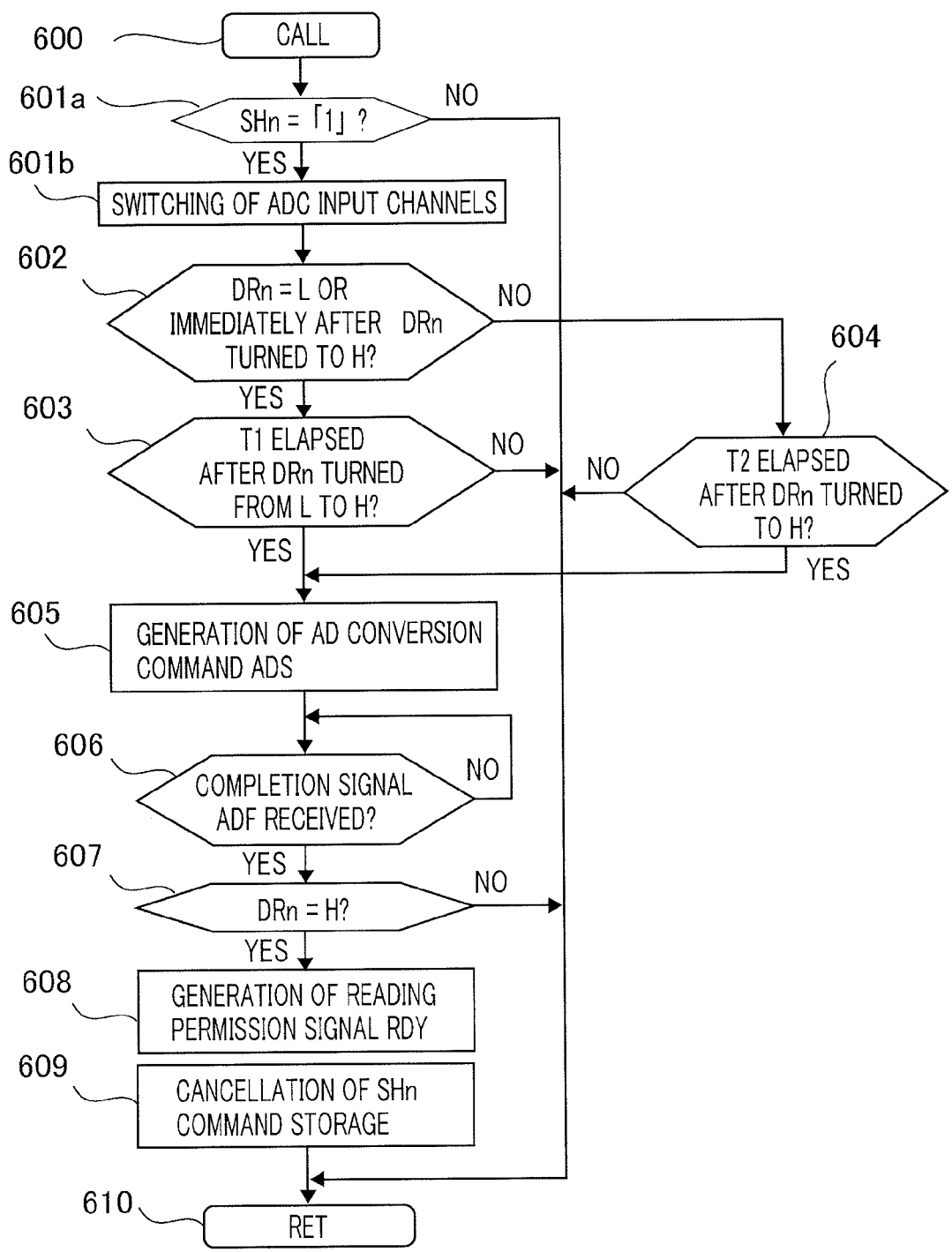
FIG. 6 is a flowchart for explaining the operation of a specific part of an electronic control apparatus according to Embodiment 1 of the present invention.

In the step block 514 carried out after the step 513b, the reading permission signal RDY for the A/D conversion data is generated, as described later with reference to FIG. 6. In the step 505 in the left column, the microprocessor 110A directly transmits a return permission signal PMT (refer to FIG. 2) to the IPM 190A; the return permission signal PMT permits return transmission by changing its logic level from "H" to "L" or from "L" to "H". The step 515 in the right column is a determination step in which it is determined whether or not the logic level of the return permission signal PMT has changed; in the case where the logic level of the return permission signal PMT has not changed, the result of the determination becomes "NO", and then the step 510a is resumed; in the case where the logic level of the return permission signal PMT has changed, the result of the determination becomes "YES", and then the step 515 is followed by the step 516a.

The step 516a is a determination step in which it is determined whether or not the reading permission signal RDY for the A/D conversion data has been generated in the step block 514; in the case where the reading permission signal RDY for the A/D conversion data has been generated, the result of the determination becomes "YES", and then, the step 516a is followed by the step 517b; in the case where the reading permission signal RDY for the A/D conversion data has not been generated, the result of the determination becomes "NO", and then, the step 516a is followed by the step 516b. The step 516b is a determination step in which, based on whether or not the command channel number of the transmission package 302 received in the step 513b is "15", which is not specified, it is determined whether or not there has been issued report request for the selection command signal SLn; in the case where there has been issued report request, the result of the determination becomes "YES", and then, the step 516b is followed by the step 517c; in the case where there has not been issued report request, the result of the determination becomes "NO", and then, the step 516b is followed by the step 517d.

In the step 517b, the A/D conversion information is returned by means of the return package 308, and then, the step 517b is followed by the step 518; in the step 517c, the present storage status of the selection command signal SLn is returned by means of the return package 307; in the step 517d, the abnormality detection information is returned while the return packages 303 through 306 are sequentially selected; in the step 518, the reading permission signal RDY generated in the step block 514b is reset; the step 510a is resumed after the steps 518, 517c, and 517d. In the step block 517e, the transmission package formed through the steps 517b, 517c, and 517d is selectively transmitted.

The step 507a following the step 505 in the left column is a determination step in which there is monitored a ready signal to be generated when the serial-parallel converter 114a completes the serial-parallel conversion. In the case where the conversion has not been completed, the result of the determination becomes "NO", and then, the step 507a is followed by the step 500b, where generation of the ready signal is waited; in the case where the serial-parallel conversion has been completed, the result of the determination becomes "YES", and then, the step 507a is followed by the step 507e. In the step 507e, the parallel conversion data of the data returned in the step block 517e is stored in the RAM memory 111.

The step 508a is a determination step in which it is determined whether or not the return data stored in the step 507e is the A/D conversion data in the step 517b; in the case where the return data stored in the step 507e is the A/D conversion data in the step 517b, the result of the determination becomes "YES", and then, the step 508a is followed by the step 508b; in the case where the return data stored in the step 507e is not the A/D conversion data in the step 517b, the result of the determination becomes "NO", and then, the step 508a is followed by the step 500b. In the step 508b, the sampling hold command SHn to be transmitted next time in the step 503b is preliminarily cancelled so that reception is acknowledged; then, the step 508b is followed by the step 509a.

In the step 509a, a target ON-pulse duty value calculated through another (unillustrated) control program is read, and by multiplying the A/D conversion data stored in the step 507e by the ON-pulse duty value, the average value of the conduction current In of the opening/closing device 140n; for example, in the step block 502, the ON-pulse width is adjusted to increase or decrease so that the calculated average current becomes equal to a predetermined target current.

In the step 509b, there is read the conduction current In at a time when the opening/closing device 140n is driven to be closed through the A/D conversion data stored in the step 507e; the power-source voltage Vb is estimated by reading a voltage inputted to the first multi-channel A/D converter 116a, which is proportional to the power-source voltage Vb;

the resistance of the electric load 104*n* is calculated by performing the division "power-source voltage Vb/conduction current In"; then, based on whether or not the load resistance Rn is a value within an upper-to-lower limit range determined by a predetermined ambient temperature, it is determined whether or not an abnormality has occurred. However, instead of performing the division "power-source voltage Vb/conduction current In", there may be performed a comparison between a threshold value proportional to the power-source voltage Vb and the conduction current In.

The estimated power-source voltage Vb applied in the step 509*b* is one of first voltage data that is proportional to the power-source voltage Vb at a time when the sampling hold command SHn is issued in the step 503*b* and second voltage data that is proportional to the power-source voltage Vb at a time when the digital conversion data DIn is received from the second multi-channel A/D converter 116*b* in the step 507*e*; alternatively, the power-source voltage Vb is estimated by utilizing the average value of the first voltage data and the second voltage data. In the case where the first voltage data or the second voltage changes largely, determination, in the step 509*b*, on whether or not an abnormality exists in the load resistor may not be performed. In the operation end step 500*b*, another control program is carried out, and within a predetermined time, the operation start step 500*a* is resumed; then, the following control program is recurrently performed.

To summarize the foregoing control flow, in the step 501*b*, at the timing when the operation starts, the transmission package 301 for initial setting is transmitted; in the step 511*b*, the IPM 190A stores the transmission package 301 in the buffer memory 115; then, in accordance with the channel number n, the serial control signal SRn or the parallel control signal PWMn is selected. In the step 5502, the opening/closing control signal is directly outputted to the opening/closing device 140*n* for which the parallel control signal PWMn has been selected; in the step 512, the opening/closing device 140*n* is opening/closing-controlled.

In the step 503*b*, the transmission package 302, which serves as a writing command, is periodically transmitted; in the step 513*b*, the serial control signal SRn, the sampling hold command SHn for the designated channel, and the selection command signal SLn or the report return request for the selection command signal SLn are stored, and in accordance with the logic status of the serial control signal SRn, the selected opening/closing device 140*n* is opening/closing-controlled. When, in the step 505, the return permission signal PMT alternately changes, one of the return packages 303 through 308 is selectively transmitted in the steps 515 through 517*d*; in the step 507*e*, the microprocessor 110A reads and stores it.

The determination on whether or not the A/D conversion information is to be returned through the return package 308 is performed based on whether or not the reading permission signal RDY corresponding to the sampling hold command SHn is generated in the step block 514. The determination on whether or not the present status of the selection command signal SLn is to be returned through the return package 307 is performed based on whether or not the command channel number n of the transmission package 302 received in the step 513*b* is "15", which is not specified.

While the return packages 303 through 306 are sequentially transmitted, the return packages 307 and 308 are transmitted in such a way as to cut into the order. However, in the case where, in the return packages 303 through 306, an abnormality occurs in the opening/closing device 140*n*, the return packages 303 through 306 including this particular opening/closing device 140*n* may be transmitted at the first priority.

The step 509*a* corresponds to an average current measurement means; the step 509*b* corresponds to a load resistor abnormality determination means.

The excess current cutoff circuit 150*an* provided in the opening/closing device 140*n* performs excess current determination, by utilizing the rated current (e.g., 5 A) of the opening/closing device 140*n* as the reference; however, because, in general, the rated current (e.g., 1 A) of the electric load 104*n* connected with the opening/closing device 140*n* is smaller than the rated current of the opening/closing device 140*n*, the abnormality determination in the step 509*b* detects the indication of an abnormality before the excess current cutoff circuit 150*an* operates.

Next, the operation of the specific step block 514 in FIG. 5A will be explained. FIG. 6 is a flowchart for explaining the operation of a specific part of an electronic control apparatus according to Embodiment 1 of the present invention. In FIG. 6, the step 600 is the operation start step of the step block 514 that is performed, when the result of the determination in the step 513*a* in FIG. 5A is "NO" or following the step 513*b*. In the step 601*a*, it is determined whether or not the sampling hold command SHn received in the step 513*b* in FIG. 5A has stored the logic "1"; in the case where the sampling hold command SHn has stored the logic "1", the result of the determination becomes "YES", and then, the step 601*a* is followed by the step 601*b*; in the case where the sampling hold command SHn has not stored the logic "1", the result of the determination becomes "NO", and then, the step 601*a* is followed by the step 610.

In the step 601*b*, the input channel numbers of the second multi-channel A/D converter 116*b* are selectively switched based on the designated channel number n of the transmission package 302 received in the step 513*b*; then, the step 601*b* is followed by the step 602. The step 602 is a determination step; in the case where, as represented in FIG. 4(C1), "SHn=1" is received at a time period in which the logic level of the driving command signal DRn is "L" and the circuit-opening command is being issued or at a timing immediately after the logic level of the driving command signal DRn changes to "H", the result of the determination becomes "YES", and then, the step 602 is followed by the step 603; in the case where "SHn=1" is received at a time instant when a predetermined time T1 elapses after the logic level of the driving command signal DRn becomes "H", the result of the determination becomes "NO", and then, the step 602 is followed by the step 604.

The step 603 is a determination step in which it is determined whether or not the acknowledgement waiting time T1 has elapsed after the logic level of the driving command signal DRn changes from to "L" to "H"; in the case where the acknowledgement waiting time T1 has elapsed, the result of the determination becomes "YES", and then, the step 603 is followed by the step 605; in the case where the acknowledgement waiting time T1 has not elapsed, the result of the determination becomes "NO", and then, the step 603 is followed by the step 610. The step 604 is a determination step in which, even in the case where, as represented in FIG. 4(C2) "SHn=1" is received at a time instant when the predetermined time T1 elapses after the logic level of the driving command signal DRn becomes "H", it is determined whether or not the acknowledgement waiting time T2 has further elapsed; in the case where the acknowledgement waiting time T2 has elapsed, the result of the determination becomes "YES", and then, the step 604 is followed by the step 605; in the case where the acknowledgement waiting time T2 has not elapsed, the result of the determination becomes "NO", and then, the step 604 is followed by the step 610.

In the step 605, the reading timing control circuit 170n generates the A/D conversion command ADS for the second multi-channel A/D converter 116b. In the step 606, it is determined whether or not the second multi-channel A/D converter 116b has generated the A/D conversion completion signal ADF or whether or not a predetermined time for performing A/D conversion has elapsed; in the case where the A/D conversion has been completed, the result of the determination becomes "YES", and then, the step 606 is followed by the step 607; in the case where the A/D conversion has not been completed, the result of the determination becomes "NO", and then, there is resumed the step 606, where the completion of the A/D conversion is waited.

The step 607 is a determination step in which it is determined whether or not the driving command signal DRn still maintains the logic level "H"; in the case where the driving command signal DRn still maintains the logic level "H", the result of the determination becomes "YES", and then, the step 607 is followed by the step 608; in the case where the logic level of the driving command signal DRn has changed to "L", the result of the determination becomes "NO", and then, the step 607 is followed by the step 610. The case where the determination in the step 607 becomes "NO" corresponds to the case where, as represented in FIG. 4(C3), the sampling hold command SHn is generated immediately before the logic level of the driving command signal DRn changes from "H" to "L".

In the step 608, the reading permission signal RDY is generated; in the step 609, the sampling hold command SHn that has been received and stored is deleted, and the next reception of the sampling hold command SHn is prepared; the step 609 is followed by the step 515 in FIG. 5A through the step 610.

(3) Gist and Feature of Embodiment 1

As is clear from the foregoing explanation, the electronic control apparatus according to Embodiment 1 of the present invention has the following features related to the invention recited in claim 1 of the present application.

The electronic control apparatus 100A is provided with the IPM 190A in which there are integrated a plurality of opening/closing devices 140n that are supplied with electric power by the external power source 101 and perform energization drive of a plurality of electric loads 104n corresponding to the channel numbers n (=1 through m), at least one of the excess current cutoff circuit 150an and the overheat shutoff circuit 150bn for the opening/closing device 140n, and the abnormality detection circuit 160n; and the microprocessor 110A connected in series with the IPM 190A by way of the serial-parallel converters 114a and 114b.

The IPM 190A further includes the second multi-channel A/D converter 116b and the selection circuit 180An for the opening/closing device 140n.

The selection circuit 180An drives the opening/closing device 140n to open or close it, by utilizing one of the serial control signal SRn that is received from the microprocessor 110A by way of the serial-parallel converters 114a and 114b and stored in an updating manner in the buffer memory 115 and the parallel control signal PWMn that is directly inputted thereto from the microprocessor 110A without passing through the serial-parallel converters 114a and 114b, or by utilizing both the control signals; in addition to that, in the case where no parallel control signal circuit is connected between the microprocessor 110A and the IPM 190A, the selection circuit 180An can determine the opening/closing state of the opening/closing device 140n, based on the logic status of the serial control signal SRn.

The abnormality detection circuit 160n generates an abnormality determination signal obtained by comparing the opening/closing state of the opening/closing device 140n with the logic status of the serial control signal SRn or the parallel control signal PWMn selected by the selection circuit 180An or a status detection signal required to perform an abnormality determination; the abnormality determination signal or the status detection signal is transmitted in series to the microprocessor 110A by way of the serial-parallel converters 114a and 114b.

The second multi-channel A/D converter 116b converts into a digital value the analogue detection signal ADIn related to the conduction currents for part or all of the opening/closing devices 140n; the digital conversion data DIn is transmitted to the microprocessor 110A by way of the serial-parallel converters 114a and 114b.

In response to the input signal inputted from the input sensor 103, the detection signal of the abnormality detection circuit 160n, and the contents of a control program stored in the program memory 112A, the microprocessor 110A opening/closing-controls the plurality of opening/closing devices 140n, by means of the serial control signal SRn or the parallel control signal PWMn, so as to control the energization drive of the plurality of electric loads 104n; the IPM 190A adjusts the reading timing in such a way that, regardless of the kind of the control signal, the digital conversion data DIn is always read during the period in which the opening/closing device 140n is driven to be closed.

The electronic control apparatus according to Embodiment 1 of the present invention has the following features related to the invention recited in claim 2 of the present application.

In response to the selection command signal SLn based on the selection command data 119 transmitted in series from the microprocessor 110A by way of the serial-parallel converters 114a and 114b, the selection circuit 180An selects one of the serial control signal SRn or the parallel control signal PWMn; the selection command data 119 is preliminarily stored in the program memory 112A; at least when the microprocessor 110A starts its operation, the selection command data 119 is collectively transmitted to the buffer memory 115 by way of the serial-parallel converters 114a and 114b; while the microprocessor 110A operates, transmission of a reading acknowledgement or a division acknowledgement is performed.

As described above, according to the invention recited in claim 2 of the present application, in response to the selection command data transmitted in series from the program memory, the selection circuit performs opening/closing control of the opening/closing device, by means of one of the serial control signal SRn or the parallel control signal PWMn.

Accordingly, the invention recited in claim 2 of the present application is characterized in that the selection processing for each of a plurality of opening/closing devices can readily be performed by use of a serial signal circuit, and in that the opening/closing device is prevented from being driven to be closed in response to an erroneous signal mistakenly inputted through the control signal for an unselected opening/closing device.

Moreover, the invention recited in claim 2 of the present application is characterized in that, because, while the microprocessor 110A operates, a reading acknowledgement or a division acknowledgement is transmitted for the selection command signal, an abnormal state can be detected or safety processing by rewriting can be performed, even when a memory in the IPM erroneously operates due to noise.

The electronic control apparatus according to Embodiment 1 of the present invention has the following features related to the invention recited in claim 6 of the present application.

The parallel control signal is a pulse-width modulation control signal PWMn in which the pulse period is constant and the proportion of the pulse ON time to the ON-and-OFF period is variable.

The second multi-channel A/D converter 116b collaborates with the reading timing control circuit 170n so as to convert into a digital value the analogue detection signal ADIn proportional to the conduction current of the opening/closing device 140n, and returns a report to the microprocessor 110A by way of the serial-parallel converters 114a and 114b, when the reading permission signal RDY is generated.

In response to the sampling hold command SHn transmitted from the microprocessor 110A by way of the serial-parallel converters 114a and 114b, the reading timing control circuit 170n supplies the A/D conversion command ADS to the second multi-channel A/D converter 116b, and generates the reading permission signal RDY when the second multi-channel A/D converter 116b generates the A/D conversion completion signal ADF or when a predetermined conversion waiting time elapses.

In the case where the sampling hold command SHn is received while the circuit-opening command to the opening/closing device 140n is issued or at a time instant immediately after the circuit-closing command is issued, the reading timing control circuit 170n becomes standby until the circuit-closing drive command is issued through the driving command signal DRn, which is the parallel control signal PWMn or the serial control signal SRn; the reading timing control circuit 170n waits for an acknowledgement until the current detection signal completely rises after the opening/closing device 140n is driven to be closed, and then generates the A/D conversion command ADS; in the case where the sampling hold command SHn is received at a timing when the opening/closing device 140n is closed and the current detection signal has completely risen, the reading timing control circuit 170n waits for the completion of changing the input channels at a time when the sampling hold command SHn is received, and then generates the A/D conversion command ADS.

The reading timing control circuit 170n generates the reading permission signal RDY, in the case where, when the second multi-channel A/D converter 116b generates the A/D conversion completion signal ADF or when a predetermined conversion waiting time elapses, the circuit-closing drive command is still being issued through the driving command signal DRn; in the case where, at a timing when the reading permission signal RDY is to be generated, the circuit-opening cutoff command has already been generated through the driving command signal DRn, the reading timing control circuit 170n becomes standby and waits for an acknowledgement until the circuit-closing drive command is issued again through the driving command signal DRn and the current detection signal completely rises.

As described above, according to the invention recited in claim 6 of the present application, the IPM is provided with a reading timing control circuit for returning a report on the digital conversion signal of the multi-channel A/D converter, and generates an A/D conversion command and a reading permission signal, based on the relationship between the reception timing of a sampling hold command transmitted in series from a microprocessor and the logic changing status of a driving command signal.

Accordingly, the invention recited in claim 6 of the present application is characterized in that, even with a parallel control signal that operates asynchronously with the sampling hold command, which is a serial signal, the conduction current of the opening/closing device that is intermittently energized can securely be read.

The electronic control apparatus according to Embodiment 1 of the present invention has the following features related to the invention recited in claim 7 of the present application.

The microprocessor 110A generates the sampling hold command SHn, and then when receiving the digital conversion data DIn through the serial-parallel converters 114b and 114a, the microprocessor 110A cancels the sampling hold command SHn, as an acknowledgement signal for the completion of reading; when the sampling hold command SHn is cancelled, the IPMs 190A and 190B each resets the digital conversion data DIn.

As described above, according to the invention recited in claim 7 of the present application, when a microprocessor completely finishes reading of digital conversion data, the sampling hold command is cancelled so that the digital conversion data in an IPM is reset.

Accordingly, the invention recited in claim 7 of the present application is characterized in that, because there is not required a maximum value holding circuit that is configured with a charging diode, a discharging transistor, and a peak hold capacitor and is commonly utilized for detecting a pulse current, simplified hardware in which only a noise protecting capacitor is provided in particular can be utilized, but also no error is posed in an analogue detection signal because no voltage drop is caused by the diode.

Moreover, the invention recited in claim 7 of the present application is characterized in that, even in the case of an opening/closing device driven to be closed by a serial control signal, the sampling hold command enables a conduction current to be timely read in an updating manner.

The electronic control apparatus according to Embodiment 1 of the present invention has the following features related to the invention recited in claim 8 of the present application.

The microprocessor 110A generates the pulse-width modulation control signal PWMn as a parallel control signal so as to opening/closing-control the opening/closing device 140n of the IPM 190A; concurrently, the microprocessor 110A reads, by way of the serial-parallel converters 114a and 114b, the conduction current of the opening/closing device 140n, which has been converted into a digital value by the second multi-channel A/D converter 116b, and calculates the average load current by multiplying the value of the read conduction current by the conduction duty, which is the proportion of the ON time of the pulse-width modulation control signal PWMn to the ON-and-OFF period and determined by the microprocessor 110A.

As described above, according to the invention recited in claim 8 of the present application, the microprocessor calculates the load current by multiplying the read conduction current of the opening/closing device by the conduction duty of the pulse-width modulation control signal PWMn.

Accordingly, the electronic control apparatus according to the invention recited in claim 8 of the present application is characterized in that, compared to an electronic control apparatus in which the conduction current is read by smoothing and averaging a detection current by means of a capacitor circuit in the IPM, not only the hardware is simplified in configuration and hence becomes compact and inexpensive, but also the average current can accurately be detected without undergoing fluctuation caused by opening/closing control.

Moreover, the electronic control apparatus according to Embodiment 1 has the following features related to the invention recited in claim 9 of the present application.

Furthermore, the first multi-channel A/D converter 116a is connected with the microprocessor 110A; the first multi-channel A/D converter 116a applies digital conversion to at least the value of a divided voltage obtained by dividing the power-source voltage Vb of the external power source 101 so as to create voltage data proportional to the power-source voltage Vb.

The microprocessor 110A estimates the power-source voltage Vb, based on one or both of the first voltage data that is proportional to the power-source voltage Vb at a time when the sampling hold command SHn is issued and the second voltage data that is proportional to the power-source voltage Vb at a time when the digital conversion data DIn is received from the second multi-channel A/D converter 116b, and then compares the value of the estimated power-source voltage Vb with the value of the energization current In of the electric load 104n transmitted from the IPM 190A; in the case where the value of the load resistor Rn of the electric load 104n does not fall within the threshold value range corresponding to a predetermined ambient temperature range, the microprocessor 110A determines in a predictive manner that the electric load 104n is abnormal.

As described above, according to the invention recited in claim 9 of the present application, the first multi-channel A/D converter provided in the microprocessor measures the voltage of the external power source for driving a load; the load resistance is calculated based on the load current transmitted from the IPM and the power-source voltage; then, it is determined whether or not the load resistance is abnormal.

Accordingly, the invention recited in claim 9 of the present application is characterized in that, even when the load current largely changes due to the change in the voltage of the external power source and the change in the resistance of the electric load, it can accurately be determined whether or not the load resistance is abnormal.

Moreover, the invention recited in claim 9 of the present application is characterized in that, because the power-source voltage is measured immediately before and after the time instant when an analogue detection signal proportional to the conduction current In is A/D-converted, no measurement error caused by the fluctuation in the power-source voltage is liable to affect the electronic control apparatus.

Embodiment 2

(1) Detailed Description of Configuration

Figure 7:
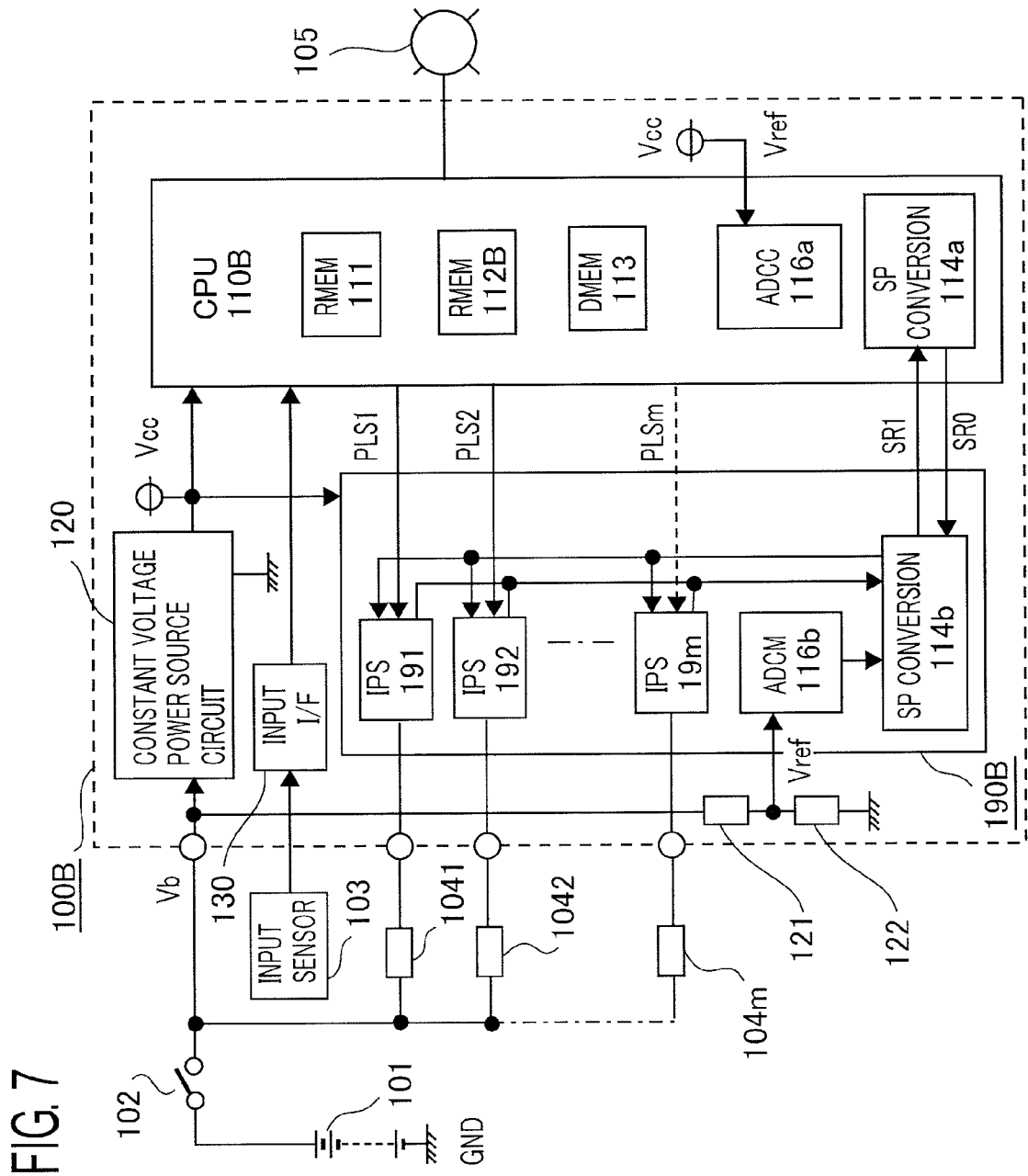
FIG. 7 is a block diagram illustrating the overall configuration of an electronic control apparatus according to Embodiment 2 of the present invention.

Next, there will be explained an electronic control apparatus according to Embodiment 2 of the present invention. FIG. 7 is a block diagram illustrating the overall configuration of an electronic control apparatus according to Embodiment 2 of the present invention. Different points between FIG. 7 and FIG. 1 will mainly be explained. In each of the drawings, the same reference characters denote the same or similar portions. In FIG. 7, an electronic control apparatus 100B is configured mainly with a microprocessor 110B, an IPM 190B, the constant voltage power source circuit 120, and the input interface circuit 130.

The microprocessor 110B includes the volatile RAM memory 111, a nonvolatile program memory 112B, the nonvolatile data memory 113, the serial-parallel converter 114a, and the first multi-channel A/D converter 116a. The IPM 190B is provided with, for example, 14 IPSs 191, 192, - - - , 19m (m=14), and performs serial communication with the serial-parallel converter 114a in the microprocessor 110B by the intermediary of the serial-parallel converter 114b; the IPM 190B also incorporates the second multi-channel A/D converter 116b that operates through a voltage, as a reference voltage Vref, which is obtained by dividing the power-source voltage Vb by the division resistors 121 and 122 and proportional to the power-source voltage Vb.

All or part of the parallel control signals PLS1 through PLSm can be connected with the IPSs 191 through 19m; the IPSs, among the IPSs 191 through 19m, which are not connected with the parallel control signals PLS1 through PLSm can perform opening/closing control by means of a serial control signal transmitted from the serial-parallel converters 114a and 114b.

The parallel control signals PLS1 through PLSm in Embodiment 2 are pulse output control signals, the period of which is variable; the pulse duty, which is the proportion of the ON time of a pulse signal to a constant ON-and-OFF period, is a constant value of approximately 50%, and the ON-and-OFF period can be changed at a frequency faster than the serial communication frequency.

Figure 8:
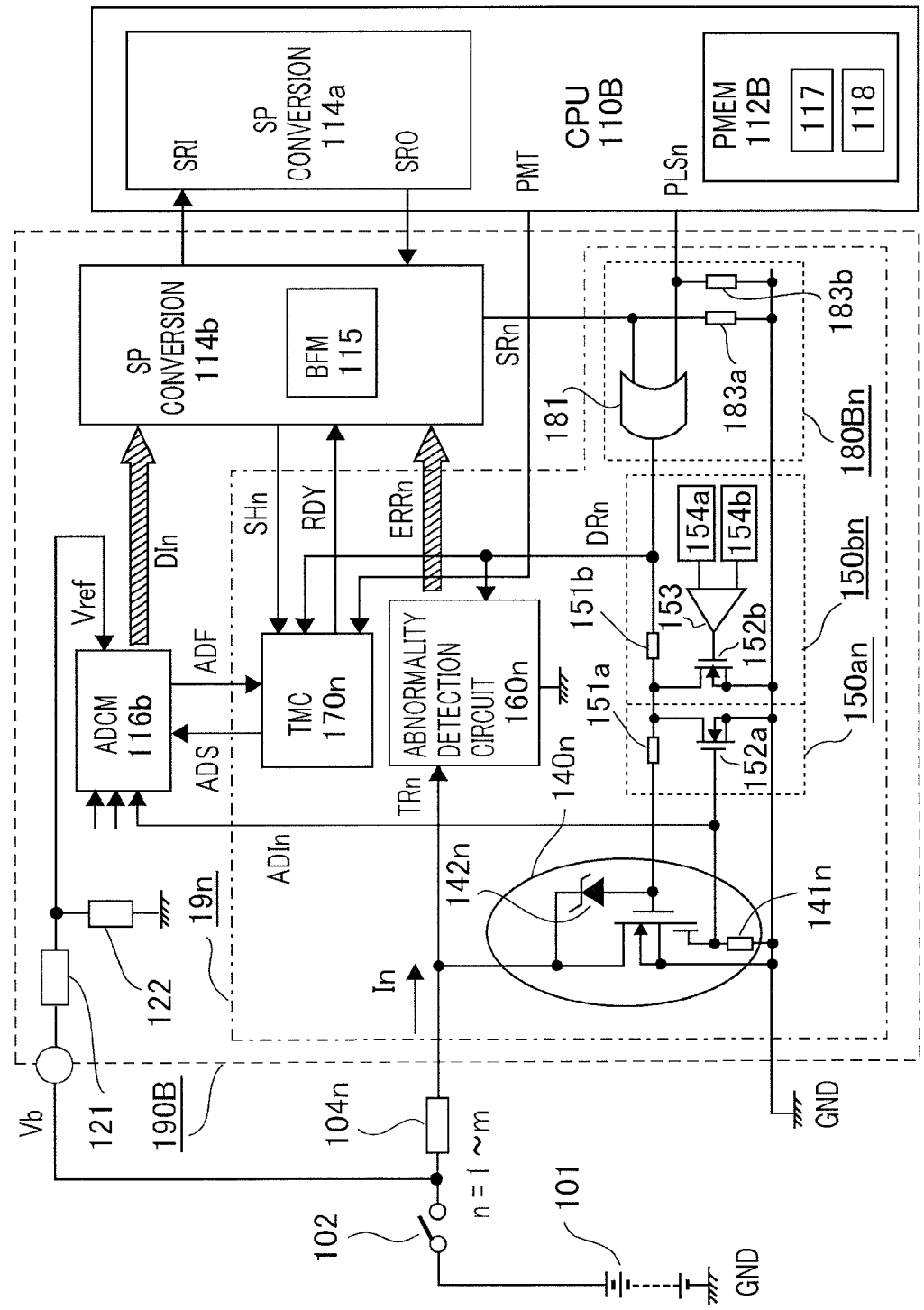
FIG. 8 is a block diagram illustrating the detail of a part of an electronic control apparatus according to Embodiment 2 of the present invention.

Next, there will be explained the detail of the IPS19n for driving and controlling the electric load 104n (n=1 through m). FIG. 8 is a block diagram illustrating the detail of a part of an electronic control apparatus according to Embodiment 2 of the present invention. In FIG. 8, as is the case with the IPS 19n in FIG. 2, the IPS 19n in FIG. 8 is configured with the opening/closing device 140n, the excess current cutoff circuit 150an, the overheat shutoff circuit 150bn, the abnormality detection circuit 160n, the reading timing control circuit 170n, and a selection circuit 180Bn; the configuration of the selection circuit 180Bn is different from that of the selection circuit 180An in FIG. 2.

A voltage obtained by dividing the power-source voltage Vb is applied, as the reference voltage, to the second multi-channel A/D converter 116b; therefore, the digital conversion data Dn corresponding to the signal voltage An of the analogue detection signal ADIn is given by Equation (1) below.

$$Dn = (An/Vref) \times (10^b - 1) \tag{1}$$

where "b" is the resolution of the second multi-channel A/D converter 116b; for example, when b=10, $(10^b - 1) = 1023$.

Here, letting R141, α, and Rn denote the resistance value of the current detection resistor 141n connected with the current mirror circuit, the current mirror ratio, and the load resistance Rn of the electric load 104n, respectively, Equation (2) below is established.

$$An = \{(Vb/Rn)/\alpha\} \times R141 \tag{2}$$

Letting R121 and R122 denote the respective resistance values of the division resistors 121 and 122, the relationship represented by Equation (3) below is established.

$$Vref = Vb \times R122/(R121 + R122) \tag{3}$$

Accordingly, Equation (4) is given by synthesizing Equations (1) through (3).

$$Dn = K/Rn \tag{4}$$

where the constant $K = \{R141 \times (R121 + R122)/(\alpha \times R122)\} \times (10^b - 1)$.

In the selection circuit 180Bn, the logical sum device 181 supplies the opening/closing device 140n with the output thereof, which is the logical sum of the serial control signal SRn and the parallel control signal PLSn, as the driving command signal DRn; the respective input terminals of the logical sum device 181 are connected with the ground through the pull-down resistors 183a and 183b. Accordingly, in the case where the parallel control signal PLSn is not connected or in the case where the logic level of the parallel control signal PLSn is "L", the driving command signal DRn performs the same logic operation as the serial control signal SRn. In the case where the logic level of the serial control signal SRn is "L", the driving command signal DRn performs the same logic operation as the parallel control signal PLSn.

The communication-data structures in Embodiment 2 are the same as those represented in FIGS. 3A through 3D described above; however, because it is not required to transmit in series the selection command signal SLn, the transmission package 301 and the return package 307 are not necessary, and the most significant bit of the third frame 302c in the transmission package 302 becomes blank.

The operation of the reading timing control circuit 170n in Embodiment 2 is the same as that represented by the time chart in FIG. 4 described above; however, as the driving command signal DRn, the pulse output control signal PLSn is utilized instead of the pulse-width modulation signal PWMn. However, the program memory 112B in Embodiment 2 is provided with a simple communication duty control means 117 and a data map 118; in the case where the simple communication duty control means 117 performs pulse-width modulation control, the driving command signal DRn in FIG. 4(A) corresponds to the serial control signal SRn.

(2) Detailed Description of Operation

Next, there will be explained the operation of the electronic control apparatus, configured as described above, according to Embodiment 2 of the present invention. Firstly, in FIGS. 7 and 8, when the power switch 102 is closed and the power-source voltage Vb is applied to the electronic control apparatus 100B, the constant voltage power source circuit 120 generates the predetermined stabilized control voltage Vcc so as to supply electric power to the microprocessor 110B; the microprocessor 110B drives and controls the electric load 104n (n=1 through m) in accordance with the operation status of the input sensor 103 and the contents of the control program stored in the program memory 112B.

The driving command signal DRn for the electric load 104n is the serial control signal SRn transmitted to the IPM 190B through the serial-parallel converters 114a and 114b or the parallel control signal PRn (in Embodiment 2, the pulse output control signal PLSn) issued from the microprocessor 110B directly to part of the electric loads 104n; the selection circuit 180Bn performs selection between the serial control signal SRn and the parallel control signal PRn.

The abnormality detection data ERRn based on the opening/closing status of the opening/closing device 140n and the digital conversion value DIn of the conduction current (load current) In of the opening/closing device 140n are transmitted to the microprocessor 110B through the serial-parallel converters 114a and 114b; based on these monitoring information items, the circuit-closing drive command to the opening/closing device 140n is cancelled or the abnormality is alarmed by the alarm display 105.

Figure 9:
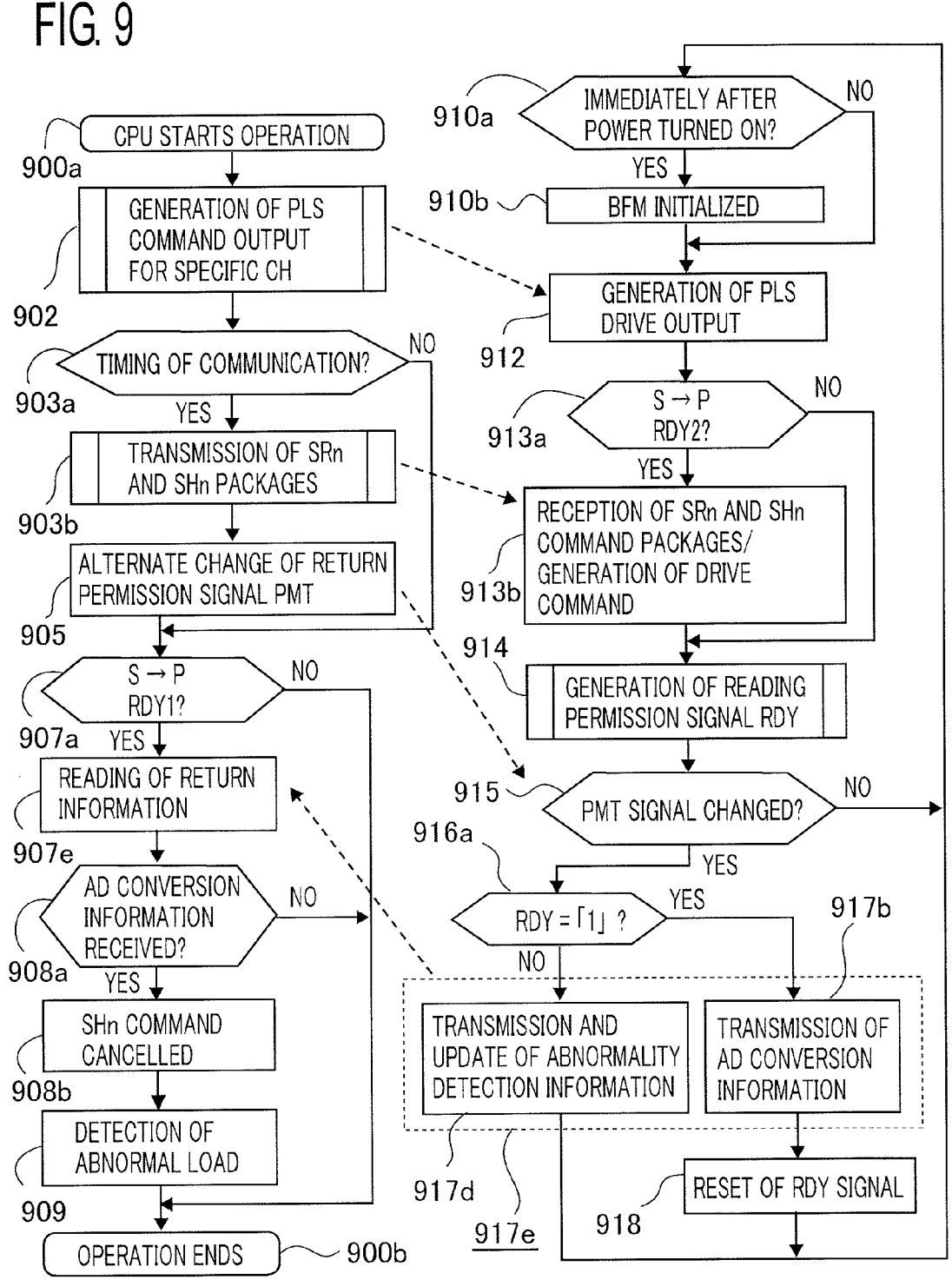
FIG. 9 is a flowchart for explaining the operation of an electronic control apparatus according to Embodiment 2 of the present invention.

FIG. 9 is a flowchart for explaining the operation of the electronic control apparatus according to Embodiment 2 of the present invention. The flowchart in FIG. 9 is obtained by replacing the reference characters in the 500s of the flowchart in FIGS. 5A and 5B by reference characters in the 900s; the main different points are that the communication data does not include the transmission package 301 in FIG. 3A and the return package 307 in FIG. 3C, that the parallel control signal is not the pulse-width modulation signal PWMn, but the pulse output control signal PLSn, and that simple communication duty control is performed through the serial control signal SRn.

In FIG. 9, a series of steps from 900a through 900b is a flowchart representing control operation performed by the microprocessor 110B, based on the control program stored in the program memory 112B; in contrast, a series of steps from 910a through 918 represented in the right column is an equivalent flowchart for explaining the logic operation performed by the logic circuit in the IPM 190B.

In the left column of the flowchart, the step 900a is the operation start step for the microprocessor 110B. In the step block 902, a command signal for the opening/closing device 140n is directly generated without passing through the serial-parallel converters 114a and 114b; as the parallel control signal PRn described in Embodiment 2, there is utilized the pulse output control signal PLSn that is a pulse train of a variable ON-and-OFF period and whose duty, which is the proportion of the ON period to the ON-and-OFF period, is constant.

In the right column of the flowchart, the step 910a is a determination step in which it is determined whether or not the stabilized control voltage Vcc has been applied to the IPM 190B; in the case where the present timing is immediately after the power source turns from OFF to ON, the result of the determination becomes "YES", and then, the step 910a is followed by the step 910b; in the case where the power source has already turned ON and the state is being kept, the result of the determination becomes "NO", and then, the step 910a is followed by the step 912. In the step 910b, the contents of the buffer memory 115 (refer to FIG. 8) is initialized; then, the step 910b is followed by the step 912. In the step 912, in response to the logic status of the parallel control signal PLSn, which is directly designated in the step block 902, the opening/closing device 140n is driven to be closed or opened.

The step 903a following the step block 902 is a determination step in which it is determined whether or not the present timing is a timing of communication with the IPM 190B; in the case where the present timing is a timing of communication, the result of the determination becomes "YES", and then, the step 903a is followed by the step 903b; in the case where the present timing is not a timing of communication, the result of the determination becomes "NO", and then the step 903a is followed by the step 907a. In the step 903a, the result of the determination becomes "YES" only one time, for example, every 10 msec. In the step 903b, there is issued a transmission command for transmitting the transmission package 302 (refer to FIG. 3B) configured with the serial control signal SRn and the sampling hold command SHn to the IPM 190B through the serial-parallel converters 114a and 114b; then, the step 903b is followed by the step 905.

The step 913a is a determination step in which, for the purpose of determining whether or not the serial-parallel conversion has been completed, there is monitored a ready signal to be generated when the serial-parallel converter 114b completes the serial-parallel conversion; in the case where the serial-parallel conversion has not been completed, the result of the determination becomes "NO", and then the step 913a is followed by the step block 914; in the case where the serial-parallel conversion has been completed, the result of the determination becomes "YES", and then, the step 913a is followed by the step 913b. In the step 913b, the parallel conversion data of the transmission package 302, for which a command is issued in the step 903b, is stored in the buffer memory 115, and in response to the logic status of the received serial control signal SRn, the opening/closing device 140n is driven to be closed or opened. In the step block 914 carried out after the step 913b, the reading permission signal RDY for the A/D conversion data is generated, as described above with reference to FIG. 6.

In the step 905 in the left column, the microprocessor 110B directly transmits the return permission signal PMT (refer to FIG. 8) to the IPM 190B; the return permission signal PMT permits return transmission by changing its logic level from "H" to "L" or from "L" to "H". The step 915 in the right column is a determination step in which it is determined whether or not the logic level of the return permission signal PMT has changed; in the case where the logic level of the return permission signal PMT has not changed, the result of the determination becomes "NO", and then the step 910a is resumed; in the case where the logic level of the return permission signal PMT has changed, the result of the determination becomes "YES", and then the step 915 is followed by the step 916a.

The step 916a is a determination step in which it is determined whether or not the reading permission signal RDY for the A/D conversion data has been generated in the step block 914; in the case where the reading permission signal RDY for the A/D conversion data has been generated, the result of the determination becomes "YES", and then, the step 916a is followed by the step 917b; in the case where the reading permission signal RDY for the A/D conversion data has not been generated, the result of the determination becomes "NO", and then, the step 916a is followed by the step 917d. In the step 917b, the A/D conversion information is returned by means of the return package 308, and then, the step 917b is followed by the step 918; in the step 917d, the abnormality detection information is returned while the return packages 303 through 306 are sequentially selected; in the step 918, the reading permission signal RDY generated in the step block 914 is reset; the step 910a is resumed after the steps 917d and 918. In the step block 917e, the transmission package formed through the steps 917b and 917d is selectively transmitted.

The step 907a following the step 905 in the left column is a determination step in which there is monitored a ready signal to be generated when the serial-parallel converter 114a completes the serial-parallel conversion. In the case where the conversion has not been completed, the result of the determination becomes "NO", and then, the step 907a is followed by the step 900b, where generation of the ready signal is waited; in the case where the serial-parallel conversion has been completed, the result of the determination becomes "YES", and then, the step 907a is followed by the step 907e. In the step 907e, the parallel conversion data of the data returned in the step block 917e is stored in the RAM memory 111.

The step 908a is a determination step in which it is determined whether or not the return data stored in the step 907e is the A/D conversion data in the step 917b; in the case where the return data stored in the step 907e is the A/D conversion data in the step 917b, the result of the determination becomes "YES", and then, the step 908a is followed by the step 908b; in the case where the return data stored in the step 907e is not the A/D conversion data in the step 917b, the result of the determination becomes "NO", and then, the step 908a is followed by the step 900b. In the step 908b, the sampling hold command SHn to be transmitted next time in the step 903b is preliminarily cancelled so that reception is acknowledged; then, the step 908b is followed by the step 909.

In the step 909, through the A/D conversion data stored in the step 907e, there is obtained a value proportional to the reciprocal of the load resistance Rn of the electric load 104n; based on whether or not the reciprocal value of the load resistance Rn is a value within an upper-to-lower limit range determined by a predetermined ambient temperature, it is determined whether or not an abnormality has occurred. In the operation end step 900b, another control program is carried out, and within a predetermined time, the operation start step 900a is resumed; then, the following control program is recurrently performed.

To summarize the foregoing control flow, in the step 902, the opening/closing control signal is directly outputted to the opening/closing device 140n for which the parallel control signal PLSn has been selected; in the step 912, the opening/closing device 140n is opening/closing-controlled. In the step 903b, the transmission package 302, which serves as a writing command, is periodically transmitted; in the step 913b, the serial control signal SRn and the sampling hold command SHn for the designated channel are stored; then, based on the logic status of the serial control signal SRn, the selected opening/closing device 140n is opening/closing-controlled. When, in the step 905, the return permission signal PMT alternately changes, one of the return packages 303 through 306 and 308 is selectively transmitted in the steps 915 through 917d; in the step 907e, the microprocessor 110B reads and stores it.

The determination on whether or not the A/D conversion information is to be returned through the return package 308 is performed based on whether or not the reading permission signal RDY corresponding to the sampling hold command SHn is generated in the step block 914. While the return packages 303 through 306 are sequentially transmitted, the return package 308 is transmitted in such a way as to cut into the order. However, in the case where, in the return packages 303 through 306, an abnormality occurs in the opening/closing device 140n, the return packages 303 through 306 including this particular opening/closing device 140n may be transmitted at the first priority. The step 909 is a step that corresponds to an abnormality determination means for the load resistance; in the step 909, it is determined whether or not the reciprocal value of the load resistance Rn is within a predetermined threshold range.

The excess current cutoff circuit 150an provided in the opening/closing device 140n performs excess current determination, by utilizing the rated current (e.g., 5 A) of the opening/closing device 140n as the reference; however, because, in general, the rated current (e.g., 1 A) of the electric load 104n connected with the opening/closing device 140n is smaller than the rated current of the opening/closing device 140n, the abnormality determination in the step 909 detects the indication of an abnormality before the excess current cutoff circuit 150an operates.

Figure 10:
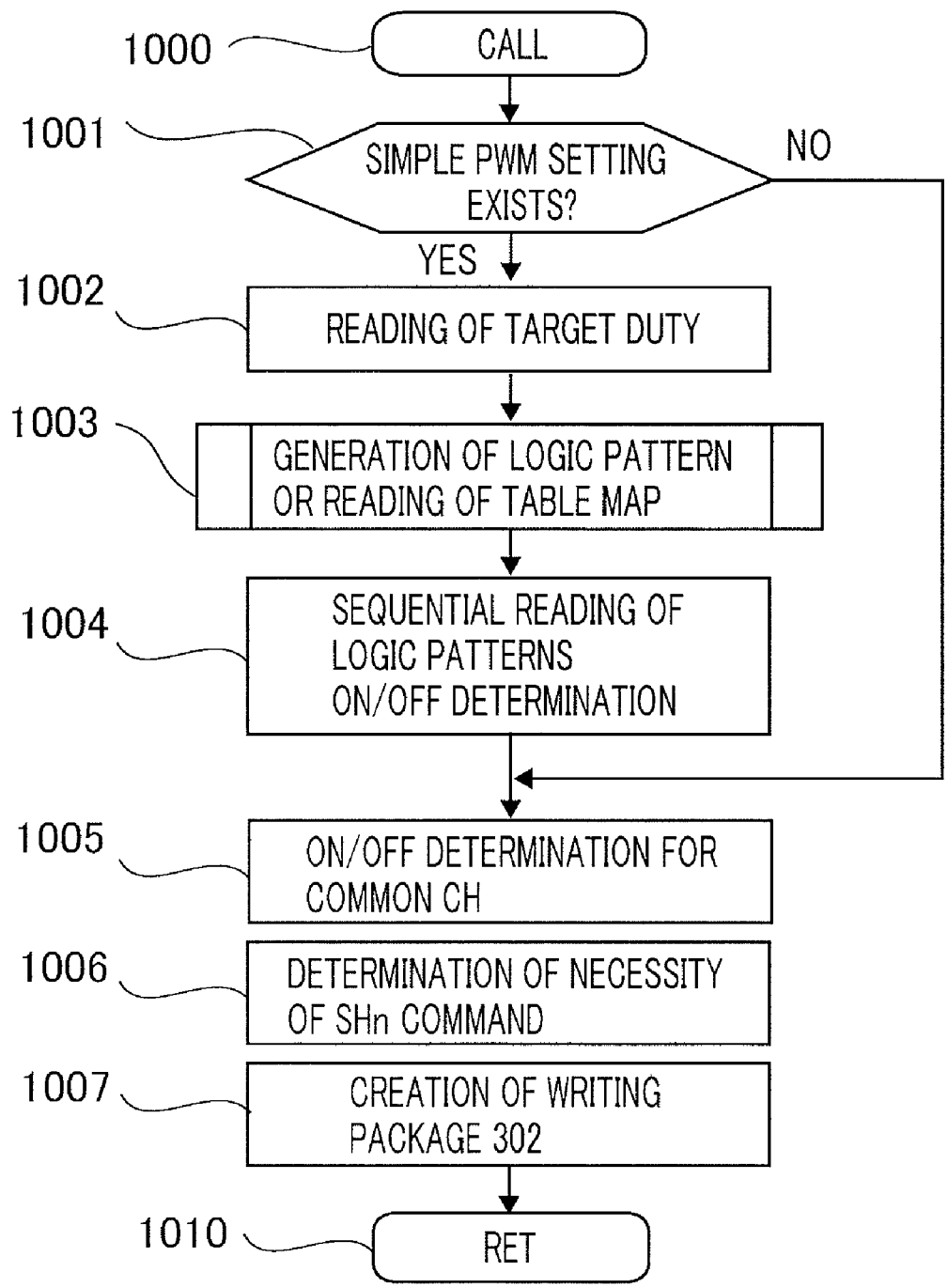
FIG. 10 is a flowchart for explaining the operation of a subroutine program in an electronic control apparatus according to Embodiment 2 of the present invention.

Next, the operation of the specific step block 903 in FIG. 9 will be explained. FIG. 10 is a flowchart for explaining the operation of a subroutine program of the electronic control apparatus according to Embodiment 2 of the present invention. In FIG. 10, the step 1000 is the operation start step of the step block 903b that follows the step 903a in FIG. 9 in the case where the result of the determination in the step 903a becomes "YES". The step 1001 is a determination step in which it is determined whether or not there exists the opening/closing device 140n for which simple communication duty control is required; in the case where there exists the opening/closing device 140n for which simple communication duty control is required, the result of the determination becomes "YES", and then, the step 1001 is followed by the step 1002; in the case where there exists no opening/closing device 140n for which simple communication duty control is required, the result of the determination becomes "NO", and then the step 1001 is followed by the step 1005.

Figure 11:
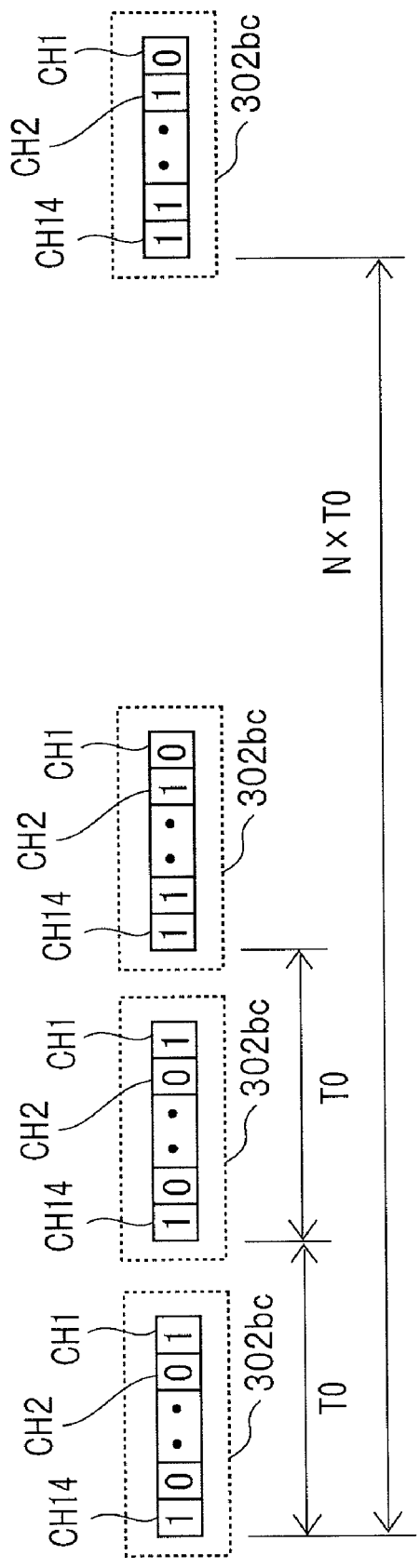
FIG. 11 is a timing chart representing transmission data in an electronic control apparatus according to Embodiment 2 of the present invention.

Here, the concept of the simple communication duty control will be explained. FIG. 11 is a timing chart representing transmission data in the electronic control apparatus according to Embodiment 2 of the present invention; FIG. 12 is a list representing the contents of a data map in the electronic control apparatus according to Embodiment 2 of the present invention. In FIG. 11, a simplified frame 302bc, which indicates the status of an opening/closing control command for the opening/closing device 140n (channel number CH1 through CH14), is obtained by extracting 7 low-order bits of the second frame 302b and 7 low-order bits of the third frame 302c from the transmission package 302 (refer to FIG. 3B) periodically transmitted in a cycle T0 from the microprocessor 110B to the IPM 190B; the logic "1" represents the circuit-closing drive command, and the logic "0" represents the circuit-opening cutoff command.

The buffer memory 115 performs storage updating operation in such a way that, once receiving the logic "1", the opening/closing device maintains the circuit-closing drive state until it receives the logic "0", and once receiving the logic "0", the opening/closing device maintains the circuit-closing drive state until it receives the logic "1".

The simple communication duty control is a controlling method in which the ON duty of S/N is obtained by performing circuit-closing drive S times while communication is performed N times (e.g., 24 times); in the data map represented in FIG. 12, it is taken into account that the circuit-closing drive command and the circuit-opening cutoff command do not converge but disperse as much as possible. In FIG. 12, for example, in the case where the circuit-closing drive is performed S (=6) times while communication is carried out N (=24) times, a single logic "1" and three logic "0"s are arranged in that order, as represented in the sixth row in the list in FIG. 12; by repeating this arrangement 6 times, 6 logic "1"s are evenly dispersed.

However, in the case where the circuit-closing drive is performed S (=7) times while communication is carried out N (=24) times, the arrangement of a single logic "1" and 2 logic "0"s and the arrangement of a single logic "1" and 3 logic "0"s are alternated, as represented in the seventh row in the list in FIG. 12, so that the respective distributions of logic "1" and logic "0" are evenly dispersed. Additionally, in the data map in FIG. 12, in the case where the number of the logic "1"s exceeds 12, (N−S) logic "0"s are evenly distributed; for example, the distribution obtained by reversing the logic in the distribution in the 11th row coincides with the distribution in the 13th row.

In FIG. 10, in the step 1002, with regard to the opening/closing device for which duty control is performed, there is read a target duty calculated by another control program, which is not illustrated; in this step, it is read how many logic "1"s need to be transmitted while communication is performed N (=24) times, for example. In the step block 1003, there is stored a necessary logic pattern read from the data map 118 that is stored in the program memory 112B and corresponds to the list in FIG. 12, or in the case where the data map is not utilized, the logic pattern is created through calculation.

In the step 1004, the logic status is determined by sequentially reading the logic pattern to be created or read in the step block 1003. In the step 1005, it is read and determined whether, as the serial control signal SRn, the circuit-closing drive command is transmitted or the circuit-opening cutoff command is transmitted to the opening/closing device, for each channel, for which no duty control is required.

In the step 1006, it is determined whether or not there is required reading of the digital conversion data through the second multi-channel A/D converter 116b, and the necessary channel number is determined, so that the logic of the sampling hold command SHn is determined. In the step 1007, the transmission package 302 (refer to FIG. 3B) is created; the step 1007 is followed by the step 905 in FIG. 9 through the step 1010.

In addition, in the step block 1003, in the case where the table map 118 is not utilized, the logic pattern is created through the calculation processing in the following manner: Firstly, when the conduction duty is the same as or smaller than 50% and the value of N/S (=γ) is an integer, there is repeated an ON/OFF pattern in which a single ON command and (γ−1) OFF commands are issued in that order. For example, when N=24 and S=6, γ=N/S=4; therefore, it is only necessary to repeat an ON/OFF pattern in which a single ON command and (γ−1=3) OFF commands are issued in that order.

When the conduction duty is the same as or smaller than 50%, the quotient of N/S is γ, and the remainder is δ, there is repeated an ON/OFF pattern in which a single ON command and (γ−1) or γ OFF commands are issued in that order, and a set of γ OFF commands are issued δ times while the pattern is repeated S times. For example, in the case where N=24 and S=7, the quotient γ is 3 (=24/7) and the remainder δ is 3; therefore, it is only necessary that there is repeated an ON/OFF pattern in which a single ON command and 2 or 3 OFF commands are issued in that order, and the OFF commands are issued 3 times while the pattern is repeated 7 times.

In the case where the conduction duty exceeds 50%, based on the complement pattern obtained by reversing ONs and OFFs of the ON/OFF pattern at a time when the conduction duty is the same as or smaller than 50%, the OFF commands are issued S times while the pattern is repeated N times, so that the conduction duty of (N−S)/N can be achieved.

In addition, when the A/D conversion value of the conduction current of the opening/closing device 140n for which the simple communication duty control is performed, the sampling hold command SHn is issued while the ON command is issued, so that no standby time represented by the dotted line in FIG. 4(C1) or by FIG. 4(C3) occurs.

(3) Gist and Feature of Embodiment 2

As is clear from the foregoing explanation, the electronic control apparatus according to Embodiment 2 of the present invention has the following features related to the invention recited in claim 1 of the present application.

The electronic control apparatus 100B is provided with the intelligent power module (referred to IPM, hereinafter) IPM 190B in which there are integrated a plurality of opening/closing devices 140n that are supplied with electric power from the external power source 101 and perform energization drive of a plurality of electric loads 104n corresponding to the channel numbers n (=1 through m), at least one of the excess current cutoff circuit 150an and the overheat shutoff circuit 150bn for the opening/closing device 140n, and the abnormality detection circuit 160n; and the microprocessor 110B connected in series with the IPM 190A by way of the serial-parallel converters 114a and 114b.

The IPM 190B further includes the second multi-channel A/D converter 116b and the selection circuit 180Bn for the opening/closing device 140n.

The selection circuit 180Bn drives the opening/closing device 140n to open or close it, by utilizing one of the serial control signal SRn that is received from the microprocessor 110B by way of the serial-parallel converters 114a and 114b and stored in an updating manner in the buffer memory 115 and the parallel control signal PLSn that is directly inputted thereto from the microprocessor 110B without passing through the serial-parallel converters 114a and 114b, or by utilizing both the control signals; in addition to that, in the case where no parallel control signal circuit is connected between the microprocessor 110B and the IPM 190B, the selection circuit 180Bn can determine the opening/closing state of the opening/closing device 140n, based on the logic status of the serial control signal SRn.

The abnormality detection circuit 160n generates an abnormality determination signal obtained by comparing the opening/closing state of the opening/closing device 140n with the logic status of the serial control signal SRn or the parallel control signal PLSn selected by the selection circuit 180Bn or a status detection signal required to perform an abnormality determination; the abnormality determination signal or the status detection signal is transmitted in series to the microprocessor 110B by way of the serial-parallel converters 114a and 114b.

The second multi-channel A/D converter 116b converts into a digital value the analogue detection signal ADIn related to the conduction currents for part or all of the opening/closing devices 140n; the digital conversion data DIn is transmitted to the microprocessor 110B by way of the serial-parallel converters 114a and 114b.

In response to the input signal inputted from the input sensor 103, the detection signal of the abnormality detection circuit 160n, and the contents of a control program stored in the program memory 112B, the microprocessor 110B opening/closing-controls the plurality of opening/closing devices 140n, by means of the serial control signal SRn or the parallel control signal PLSn, so as to control the energization drive of the plurality of electric loads 104n; the IPM 190B adjusts the reading timing in such a way that, regardless of the kind of the control signal, the digital conversion data DIn is always read during the period in which the opening/closing device 140n is driven to be closed.

The electronic control apparatus according to Embodiment 2 of the present invention has the following features related to the invention recited in claim 3 of the present application.

The selection circuit 180Bn is a logic sum selection circuit in which, in the case where at least one of the serial control signal SRn transmitted from the microprocessor 110B through the serial-parallel converters 114a and 114b and the parallel control signal PLSn directly designated without passing through the serial-parallel converters 114a and 114b is logic "1", the opening/closing device 140n is driven to be closed, and in the case where both the serial control signal SRn and the parallel control signal PLSn are logic "0", the opening/closing device is driven to be opened; the input circuit for the parallel control signal PLSn is biased with a pull-up resistor or a pull-down resistor inside or outside the IPM 190B, and in the case where no parallel control signal input circuit is connected, the input signal becomes logic "0".

As described above, according to the invention recited in claim 3 of the present application, the selection circuit performs opening/closing control of the opening/closing device in response to the logic sum of the serial control signal and the parallel control signal, and the parallel control signal is biased in such a way as to drive the opening/closing device to open it when the logic becomes "1".

Accordingly, the invention recited in claim 3 of the present application is characterized in that the opening/closing device can freely be driven to be closed through either the serial control signal or the parallel control signal, and in the case where no parallel control signal is connected, the opening/closing control can be performed even only through the serial control signal.

The electronic control apparatus according to Embodiment 2 of the present invention has the following features related to the invention recited in claim 6 of the present application.

The parallel control signal is a pulse output control signal PLSn in which the pulse period is variable and the proportion of the pulse ON time to the ON-and-OFF period is constant; the second multi-channel A/D converter 116b collaborates with the reading timing control circuit 170n so as to convert into a digital value the analogue detection signal ADIn proportional to the conduction current of the opening/closing device 140n, and returns a report to the microprocessor 110B by way of the serial-parallel converters 114a and 114b, when the reading permission signal RDY is generated.

In response to the sampling hold command SHn transmitted from the microprocessor 110B by way of the serial-parallel converters 114a and 114b, the reading timing control circuit 170n supplies the A/D conversion command ADS to the second multi-channel A/D converter 116b, and generates the reading permission signal RDY when the second multi-channel A/D converter 116b generates the A/D conversion completion signal ADF or when a predetermined conversion waiting time elapses.

In the case where the sampling hold command SHn is received while the circuit-opening command to the opening/closing device 140n is issued or at a time instant immediately after the circuit-closing command is issued, the reading timing control circuit 170n becomes standby until the circuit-closing drive command is issued through the driving command signal DRn, which is the parallel control signal PLSn or the serial control signal SRn; the reading timing control circuit 170n waits for an acknowledgement until the current detection signal completely rises after the opening/closing device 140n is driven to be closed, and then generates the A/D conversion command ADS; in the case where the sampling hold command SHn is received at a timing when the opening/closing device 140n is closed and the current detection signal has completely risen, the reading timing control circuit 170n waits for the completion of changing the input channels at a time when the sampling hold command SHn is received, and then generates the A/D conversion command ADS.

The reading timing control circuit 170n generates the reading permission signal RDY, in the case where, when the second multi-channel A/D converter 116b generates the A/D conversion completion signal ADF or when a predetermined conversion waiting time elapses, the circuit-closing drive command is still being issued through the driving command signal DRn; in the case where, at a timing when the reading permission signal RDY is to be generated, the circuit-opening cutoff command has already been generated through the driving command signal DRn, the reading timing control circuit 170n becomes standby and waits for an acknowledgement until the circuit-closing drive command is issued again through the driving command signal DRn and the current detection signal completely rises.

The electronic control apparatus according to Embodiment 2 of the present invention has the following features related to the invention recited in claim 10 of the present application.

A voltage proportional to the power-source voltage Vb of the external power source 101 is applied, as the reference voltage Vref, to the reference voltage terminal of the second multi-channel A/D converter 116b; the value obtained by applying digital conversion to the load current In of the electric load 104n by the second multi-channel A/D converter 116b becomes inversely proportional to the load resistance Rn of the electric load 104n; in the case where the transmitted value that is in inverse proportion to the load resistance Rn exceeds a threshold range corresponding to a predetermined ambient temperature range, the microprocessor 110B determines in a predictive manner that an abnormality exists in the electric load 104n.

As described above, according to the invention recited in claim 10 of the present application, the second multi-channel A/D converter 116b operates with a value, as the reference voltage, which is in proportion to the power-source voltage of the external power source for driving the load, and the value obtained by applying digital conversion to the load current becomes inversely proportional to the value of the load resistance, regardless of the fluctuation in the power-source voltage.

Accordingly, the invention recited in claim 10 of the present application is characterized in that, because the microprocessor is not required to correct the change in the load current caused by the change in the power-source voltage so as to calculate the load resistance, the control load on the microprocessor is reduced and the microprocessor is not required to measure the power-source voltage.

The electronic control apparatus according to Embodiment 2 of the present invention has the following features related to the invention recited in claim 11 of the present application.

The program memory 112B that collaborates with the microprocessor 110B includes a control program that serves as the simple conduction duty control units 117 that does not depend on the parallel control signal and utilizes the serial control signal SRn.

The simple conduction duty control units 117 is a means for obtaining the conduction duty S/N or (N−S)/N by performing circuit-closing drive or open circuit cutoff of the open/closing device 140*n* S times while the serial control signal SRn is transmitted predetermined times (N times).

When the conduction duty is the same as or smaller than 50% and the value of N/S (=γ) is an integer, there is repeated an ON/OFF pattern in which a single ON command and (γ−1) OFF commands are issued in that order; when the conduction duty is the same as or smaller than 50%, the quotient of N/S is γ, and the remainder is δ, there is repeated an ON/OFF pattern in which a single ON command and (γ−1) or γ OFF commands are issued in that order, and a set of γ OFF commands are issued δ times while the pattern is repeated S times.

In the case where the conduction duty exceeds 50%, based on the complement pattern obtained by reversing ONs and OFFs of the ON/OFF pattern at a time when the conduction duty is the same as or smaller than 50%, the OFF commands are issued S times while the pattern is repeated N times, so that the conduction duty of (N−S)/N can be achieved.

As described above, according to the invention recited in claim 11 of the present application, the program memory that collaborates with the microprocessor includes a control program that serves the simple conduction duty control units 117; the simple conduction duty control units 117 is a means for obtaining the conduction duty S/N or (N−S)/N by performing dispersed circuit-closing drive or dispersed open circuit cutoff of the open/closing device 140*n* S times while the serial control signal SRn is transmitted predetermined times (N times).

Accordingly, because, even the simple conduction duty control units, in which ON/OFF control is slowly performed in a cycle of a great number of serial communications, can suppress ripple fluctuation in the load current, serial communication enables variable conduction duty control, in the case of an electric load, such as a heater, which does not require rapid responsiveness in performing control; thus, the invention recited in claim 11 of the present application is characterized in that the number of output terminals of the microprocessor can be suppressed.

The electronic control apparatus according to Embodiment 2 of the present invention has the following features related to the invention recited in claim 12 of the present application.

In the simple conduction duty control units 117, the ON command timing and the OFF command timing of the serial control signal SRn are selected from the data map 118 corresponding to the required conduction duty.

The data map 118 is preliminarily stored in the program memory 112B; in the data map, the ON commands and the OFF commands are arranged in a dispersed manner in order to prevent them from converging.

As described above, according to the invention recited in claim 12 of the present application, the program memory that collaborates with the microprocessor includes a control program that serves the simple conduction duty control units 117; the ON/OFF command timings are arranged in a dispersed manner in the data map from which the timings are selected in accordance with the required conduction duty.

Accordingly, the microprocessor is not required to make a complicated calculation for the purpose of dispersing the ON commands and the OFF commands; thus, the invention recited in claim 12 of the present application is characterized in that, by utilizing a preliminarily set data map so as to readily generate a dispersed command signal, the ripple of the load current can be suppressed.

Embodiment 3

(1) Detailed Description of Configuration and Operation

Figure 13:
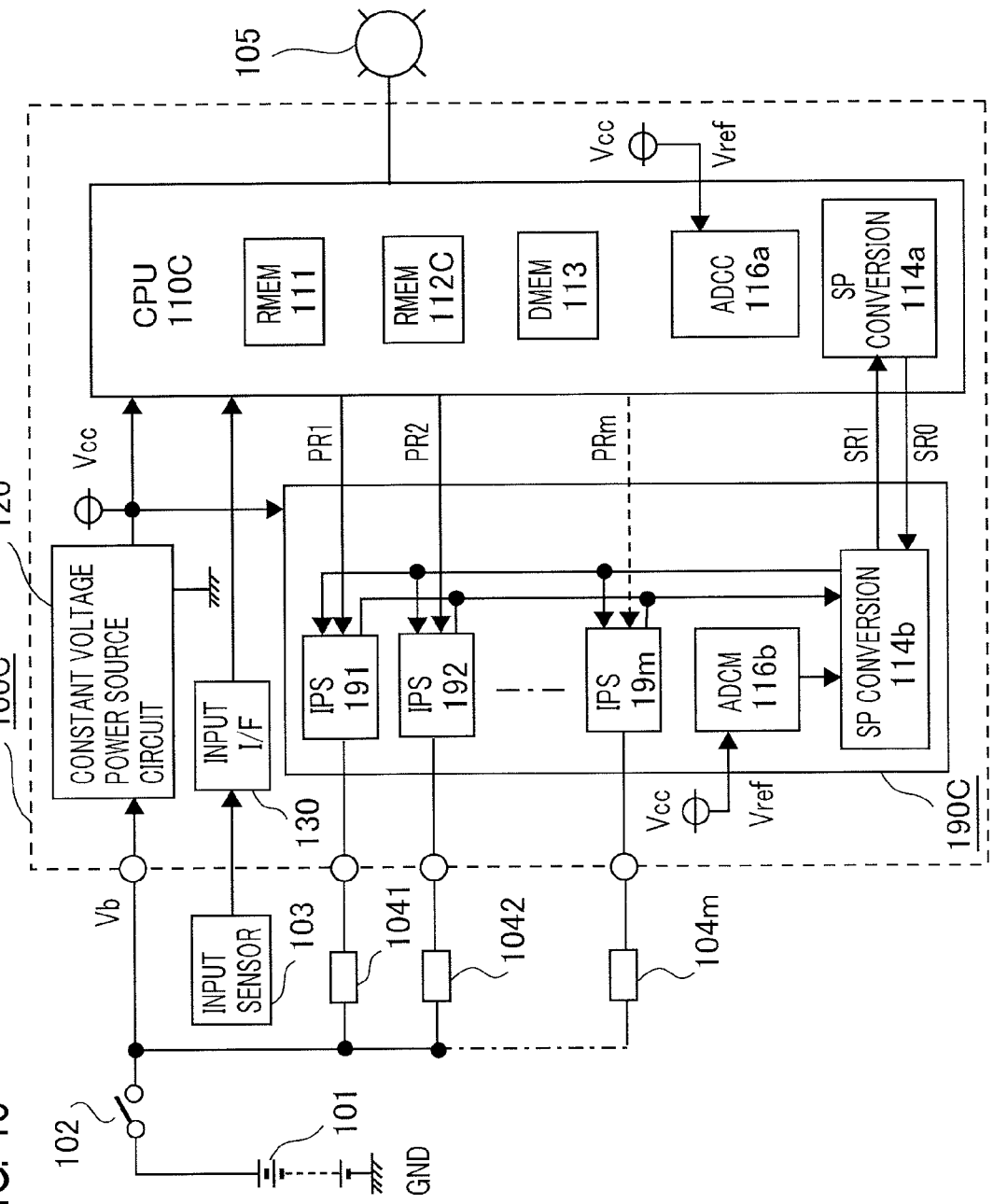
FIG. 13 is a block diagram illustrating the overall configuration of an electronic control apparatus according to Embodiment 3 of the present invention.

Next, there will be explained an electronic control apparatus according to Embodiment 3 of the present invention. FIG. 13 is a block diagram illustrating the overall configuration of an electronic control apparatus according to Embodiment 3 of the present invention. Different points between FIG. 13 and FIG. 1 will mainly be explained. In each of the drawings, the same reference characters denote the same or similar portions. In FIG. 13, an electronic control apparatus 100C is configured mainly with a microprocessor 110C, an IPM 190C, the constant voltage power source circuit 120, and the input interface circuit 130.

The microprocessor 110C includes the volatile RAM memory 111, a nonvolatile program memory 112C, the nonvolatile data memory 113, the serial-parallel converter 114*a*, and the first multi-channel A/D converter 116*a*. The IPM 190C is provided with, for example, 14 IPSs 191, 192, - - - , 19*m* (m=14), and performs serial communication with the serial-parallel converter 114*a* in the microprocessor 110C by the intermediary of the serial-parallel converter 114*b*; the IPM 190C also incorporates the second multi-channel A/D converter 116*b* that operates through the stabilized control voltage Vcc as the reference voltage Vref.

All or part of the parallel control signals PR1 through PRm can be connected with the IPSs 191 through 19*m*; the IPSs, among the IPSs 191 through 19*m*, which are not connected with the parallel control signals PR1 through PRm can perform opening/closing control by means of a serial control signal transmitted from the serial-parallel converters 114*a* and 114*b*.

Each of the parallel control signals PR1 through PRm may be the pulse-width modulation signal described with reference to FIG. 1, the variable-period pulse output control signal described with reference to FIG. 7, or the mixture of them; however, as another example, there is included at least a single interlock signal for concurrently interrupting control outputs through the serial control signals SRn. For example, a single interlock signal is utilized as the parallel control signal for concurrently performing circuit-opening cutoff of all the opening/closing devices that are operated through the serial control signals SRn.

Figure 14:
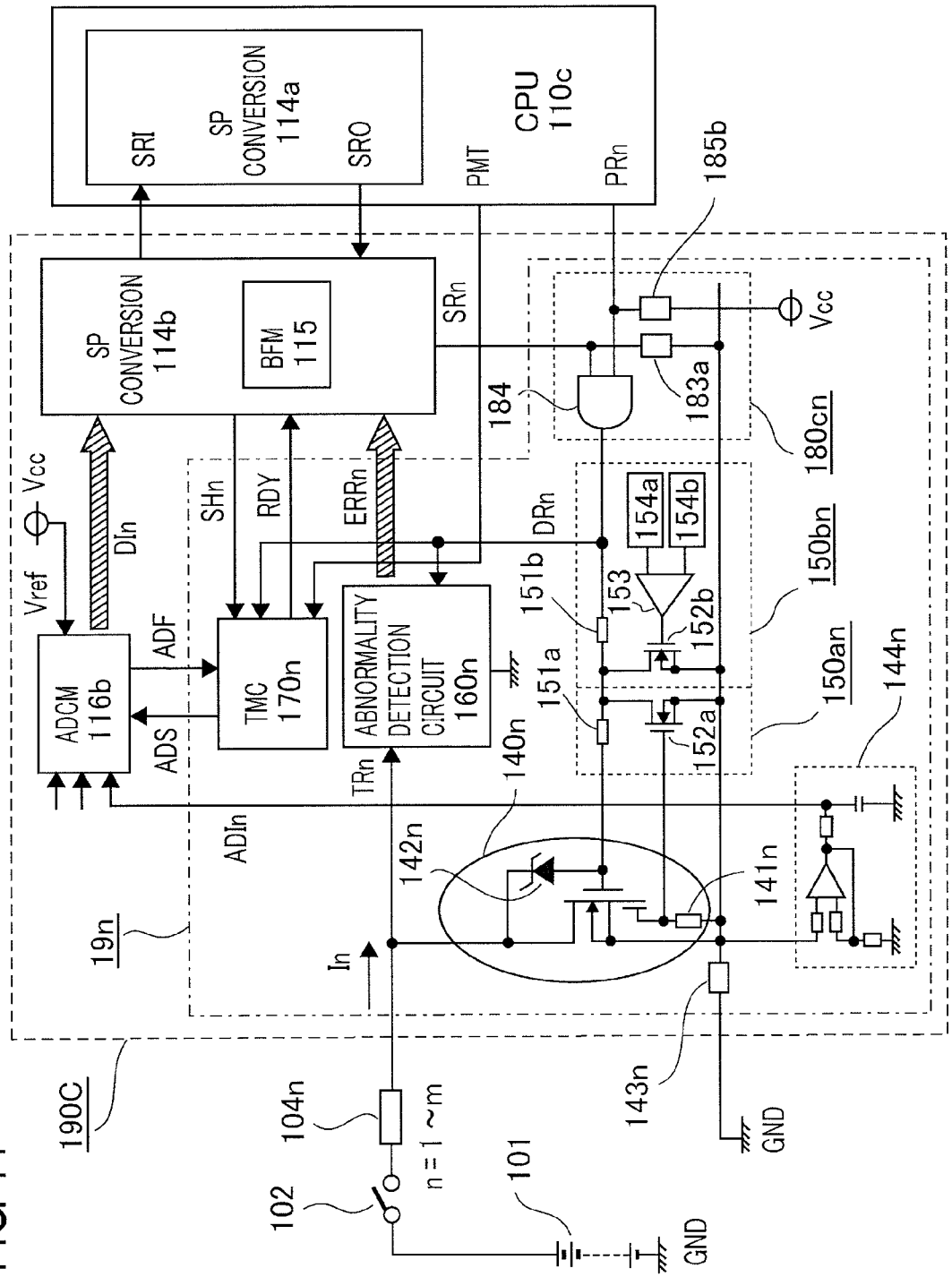
FIG. 14 is a block diagram illustrating the detail of a part of an electronic control apparatus according to Embodiment 3 of the present invention.

Next, there will be explained the detail of the IPS19*n* for driving and controlling the electric load 104*n* (n=1 through m). FIG. 14 is a block diagram illustrating the detail of a part of the electronic control apparatus according to Embodiment 3 of the present invention. In FIG. 14, as is the case with the IPS 19*n* in FIG. 2 or FIG. 8, the IPS 19*n* in FIG. 14 is configured with the opening/closing device 140*n*, the excess current cutoff circuit 150*an*, the overheat shutoff circuit 150*bn*, the abnormality detection circuit 160*n*, the reading timing control circuit 170*n*, and a selection circuit 180Cn; the configuration of the selection circuit 180Cn is different from that of the selection circuit in FIG. 2 or FIG. 8. AS the analogue detection signal ADIn to be inputted to the second multi-channel A/D converter 116b, there is utilized a voltage obtained by amplifying by the current detection circuit 144n the voltage across the current detection resistor 143n inserted between the source terminal of the opening/closing device 140n and the ground GND. As a result, the load current In can accurately be measured.

In the selection circuit 180Cn, the logical multiplication device 184 supplies the opening/closing device 140n with the output of the logical multiplication of the serial control signal SRn which serves as a first input and the parallel control signal PRn which serves as a second input, as the driving command signal DRn; the first input terminal of the logical multiplication device 184 are connected with the ground GND through the pull-down resistors 183a; the second input terminal thereof is connected with the stabilized control voltage Vcc through a pull-up resistor 185b.

Accordingly, in the case where the parallel control signal PRn is not connected or in the case where the logic level of the parallel control signal PRn is "H", the driving command signal DRn performs the same logic operation as the serial control signal SRn. In the case where the logic level of the serial control signal SRn is "H", the driving command signal DRn performs the same logic operation as the parallel control signal PRn.

The communication-data structures in Embodiment 3 are the same as those represented in FIGS. 3A through 3D described above; however, because it is not required to transmit in series the selection command signal SLn, the transmission package 301 and the return package 307 are not necessary, and the most significant bit of the third frame 302c in the transmission package 302 becomes blank.

The operation of the reading timing control circuit 170n in Embodiment 3 is the same as that represented by the time chart in FIG. 4; however, as the driving command signal DRn, an arbitrary parallel control signal PRn or an arbitrary serial control signal SRn is utilized instead of the pulse-width modulation signal PWMn. Furthermore, the program memory 112C in Embodiment 3 is provided with the simple communication duty control means 117 and the data map 118; in the case where the simple communication duty control means 117 performs pulse-width modulation control, the driving command signal DRn in FIG. 4(A) corresponds to the serial control signal SRn.

In the electronic control apparatus 100C, configured as described above, according to Embodiment 3 of the present invention, when the power switch 102 is closed and the power-source voltage Vb is applied to the electronic control apparatus 100C, the constant voltage power source circuit 120 generates the predetermined stabilized control voltage Vcc so as to supply electric power to the microprocessor 110C; the microprocessor 110C drives and controls the electric load 104n (n=1 through m) in accordance with the operation status of the input sensor 103 and the contents of the control program stored in the program memory 112C.

The driving command signal DRn for the electric load 104n is the serial control signal SRn transmitted to the IPM 190C through the serial-parallel converters 114a and 114b or a parallel control signal PRn issued from the microprocessor 110C directly to part of the electric loads 104n; the selection circuit 180Cn performs selection between the serial control signal SRn and the parallel control signal PRn.

The abnormality detection data ERRn based on the opening/closing status of the opening/closing device 140n and the digital conversion value DIn of the conduction current (load current) In of the opening/closing device 140n are transmitted to the microprocessor 110C through the serial-parallel converters 114a and 114b; based on these monitoring information items, the circuit-closing drive command to the opening/closing device 140n is cancelled or the abnormality is alarmed by the alarm display 105.

The flowchart of the control operation is the same as that in FIG. 9 described above; however, in order to drive and control the opening/closing device for a specific channel through the parallel control signal in the step 902 represented in FIG. 9, the serial control signal SRn for the specific channel needs to be preliminarily set to logic "1".

(2) Explanation for Variant Example of Embodiment 3

Figure 15:
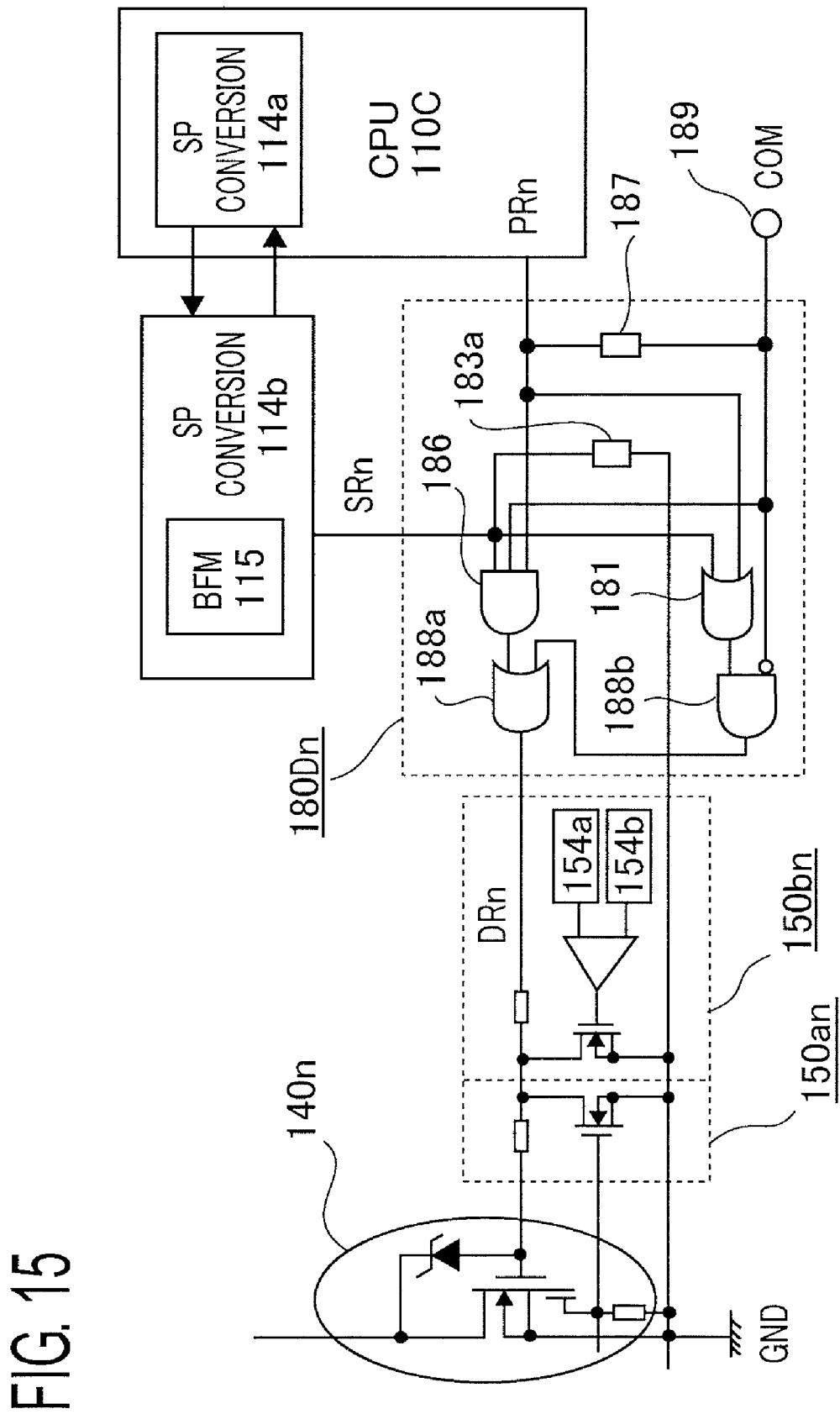
FIG. 15 is a block diagram illustrating a variant example of selection circuit in an electronic control apparatus according to Embodiment 3 of the present invention.

Next, there will be explained a variant example of selection circuit in the electronic control apparatus according to Embodiment 3 of the present invention. FIG. 15 is a block diagram illustrating a variant example of selection circuit in the electronic control apparatus according to Embodiment 3 of the present invention. In FIG. 15, a selection circuit 180Dn that is utilized instead of the selection circuit 180Cn utilized in FIG. 14 is provided with a logic sum device 181 that generates the output of the logic sum of the serial control signal SRn and the parallel control signal PRn and a logic multiplication device 186 that generates the output of the logic multiplication of the serial control signal SRn and the parallel control signal PRn; the serial control signal SRn is connected with the ground GND through the pull-down resistors 183a; the parallel control signal PRn is connected with a mode selection terminal 189 through a biasing resistor 187.

The mode selection terminal 189 is preliminarily connected with the ground GND or the stabilized power-source voltage Vcc; if the mode selection terminal 189 is connected with the ground GND, the logic level of the output of the logical multiplication device 186 becomes "L", and hence the output of the logical sum device 181 is inputted to a logical sum device 188a by way of a gate device 188b.

As a result, the driving command signal DRn, which is the output of the logical sum device 188a, becomes the logic sum of the parallel control signal PRn and the serial control signal SRn obtained through the logic sum device 181; in the case where the logic level of any one of the serial control signal SRn and the parallel control signal PRn is "H", the logic level of the driving command signal DRn becomes "H" and drives the opening/closing device 140n to close it; in the case where the logic levels of the serial control signal SRn and the parallel control signal PRn are "L", the logic level of the driving command signal DRn becomes "L" and drives the opening/closing device 140n to open it.

If the mode selection terminal 189 is connected with the stabilized control voltage Vcc, the logic level of the output of the gate device 188b becomes "L", and hence the output of the logical multiplication device 186 is inputted to the logical sum device 188a. As a result, the driving command signal DRn, which is the output of the logical sum device 188a, becomes the logical multiplication of the parallel control signal PRn and the serial control signal SRn obtained through the logical multiplication device 186; in the case where the logic level of any one of the serial control signal SRn and the parallel control signal PRn is "L", the logic level of the driving command signal DRn becomes "L" and cuts off the opening/closing device 140n; in the case where the logic levels of the serial control signal SRn and the parallel control signal PRn are "H", the logic level of the driving command signal DRn becomes "H" and drives the opening/closing device 140n to close it.

Accordingly, it is determined by the logic level of the mode selection terminal 189 whether the driving command signal DRn becomes the logic sum or the logic multiplication of the serial control signal SRn and the parallel control signal PLSn.

(3) Gist and Feature of Embodiment 3

As is clear from the foregoing explanation, the electronic control apparatus according to Embodiment 3 of the present invention has the following features related to the invention recited in claim 1 of the present application.

The electronic control apparatus 100C is provided with the intelligent power module (referred to IPM, hereinafter) IPM 190C in which there are integrated a plurality of opening/closing devices 140n that are supplied with electric power from the external power source 101 and perform energization drive of a plurality of electric loads 104n corresponding to the channel numbers n (=1 through m), at least one of the excess current cutoff circuit 150an and the overheat shutoff circuit 150bn for the opening/closing device 140n, and the abnormality detection circuit 160n; and the microprocessor 110C connected in series with the IPM by way of the serial-parallel converters 114a and 114b.

The IPM 190C further includes the second multi-channel A/D converter 116b and the selection circuits 180Cn and 180Dn for the opening/closing device 140n.

The selection circuits 180Cn and 180Dn each drives the opening/closing device 140n to open or close it, by utilizing one of the serial control signal SRn that is received from the microprocessor 110C by way of the serial-parallel converters 114a and 114b and stored in an updating manner in the buffer memory 115 and the parallel control signal PRn that is directly inputted thereto from the microprocessor 110C without passing through the serial-parallel converters 114a and 114b, or by utilizing both the control signals; in addition to that, in the case where no parallel control signal circuit is connected between the microprocessor 110C and the IPM 190C, the opening/closing state of the opening/closing device 140n can be determine, based on the logic status of the serial control signal SRn.

The abnormality detection circuit 160n generates an abnormality determination signal obtained by comparing the opening/closing state of the opening/closing device 140n with the logic status of the serial control signal SRn or the parallel control signal PRn selected by the selection circuits 180Cn and 180Dn or a status detection signal required to perform an abnormality determination; the abnormality determination signal or the status detection signal is transmitted in series to the microprocessor 110C by way of the serial-parallel converters 114a and 114b.

The second multi-channel A/D converter 116b converts into a digital value the analogue detection signal ADIn related to the conduction currents of part or all of the opening/closing devices 140n; the digital conversion data DIn is transmitted to the microprocessor 110C by way of the serial-parallel converters 114a and 114b.

In response to the input signal inputted from the input sensor 103, the detection signal of the abnormality detection circuit 160n, and the contents of a control program stored in the program memory 112C, the microprocessor 110C opening/closing-controls the plurality of opening/closing devices 140n, by means of the serial control signal SRn or the parallel control signal PRn, so as to control the energization drive of the plurality of electric loads 104n; the IPM 190C adjusts the reading timing in such a way that, regardless of the kind of the control signal, the digital conversion data DIn is always read during the period in which the opening/closing device 140n is driven to be closed.

The electronic control apparatus according to Embodiment 3 of the present invention has the following features related to the invention recited in claim 4 of the present application.

The selection circuit 180Cn is a logic multiplication selection circuit in which, in the case where both the serial control signal SRn transmitted from the microprocessor 110C through the serial-parallel converters 114a and 114b and the parallel control signal PRn directly designated without passing through the serial-parallel converters 114a and 114b is logic "1", the opening/closing device 140n is driven to be closed, and in the case where at least one of the serial control signal SRn and the parallel control signal PRn is logic "0", the opening/closing device is driven to be opened; the input circuit for the parallel control signal PRn is biased with a pull-up resistor or a pull-down resistor inside or outside the IPM 190C, and in the case where no parallel control signal input circuit is connected, the input signal becomes logic "1".

As described above, according to the invention recited in claim 4 of the present application, the selection circuit performs opening/closing control of the opening/closing device in response to the logical multiplication of the serial control signal and the parallel control signal, and the parallel control signal is biased in such a way as to drive the opening/closing device to close it when the logic becomes "1".

Accordingly, the invention recited in claim 4 of the present application is characterized in that the opening/closing device can freely be driven to be closed through either the serial control signal or the parallel control signal, and in the case where no parallel control signal is connected, the opening/closing control can be performed even only through the serial control signal.

Moreover, the invention recited in claim 4 of the present application is characterized in that, when a single parallel control signal makes the parallel control signals non-drive-logic at the same time, the respective opening/closing operations, of the opening/closing devices, through the serial control signal are concurrently prohibited and hence the interlock control for raising the safety can be performed.

Still moreover, according to the invention recited in claim 5 of the present application, the selection circuit 180Dn is provided with the logical sum device 181 which serves as a logic sum selection circuit for selecting the logic sum of the serial control signal SRn and the parallel control signal PRn, the logical multiplication device 186 which serves as a logic multiplication selection circuit for selecting the logic multiplication of the serial control signal SRn and the parallel control signal PRn, and the mode selection terminal 189.

The mode selection terminal 189 is preliminarily connected with the ground GND or the stabilized control voltage Vcc; in accordance with the logic level of the mode selection terminal 189, the output of the logic sum selection circuit or the logic multiplication selection circuit becomes effective.

As described above, according to the invention recited in claim 5 of the present application, the IPM is provided with both the logic sum selection circuit and the logic multiplication selection circuit; it is determined by the logic level of the mode selection terminal whether the logic sum selection circuit is utilized or the logic multiplication selection circuit is utilized.

Accordingly, the invention recited in claim 5 of the present application is characterized in that a user can select the logic sum selection circuit or the logic multiplication circuit, as the selection circuit, and hence the issue of selection command through serial communication is not required.

Various modifications and alterations of this invention will be apparent to those skilled in the art without departing from the scope and spirit of this invention, and it should be understood that this is not limited to the illustrative embodiments set forth herein.

What is claimed is:

1. An electronic control apparatus comprising:
a plurality of opening/closing devices that are supplied with electric power from an external power source and perform energization drive of a plurality of electric loads corresponding to channel numbers;
an intelligent power module in which there are integrated an abnormality detection circuit and at least one of an excess current cutoff circuit and an overheat shutoff circuit for the opening/closing device; and
a microprocessor connected mutually in series with the intelligent power module by the intermediary of a serial-parallel converter;
wherein the intelligent power module further includes a second multi-channel A/D converter and respective selection circuit for the opening/closing devices,
wherein the selection circuit performs circuit-closing drive or circuit-opening cutoff of the opening/closing device, by utilizing at least one of or both a serial control signal that is received from the microprocessor by way of the serial-parallel converter and stored in an updating manner in a buffer memory and a parallel control signal that is directly inputted thereto from the microprocessor without passing through the serial-parallel converter; in addition to that, in the case where no parallel control signal circuit is connected between the microprocessor and the intelligent power module, the selection circuit can determine the opening/closing state of the opening/closing device, based on the logic status of the serial control signal,
wherein the abnormality detection circuit generates an abnormality determination signal, obtained by comparing the opening/closing state of the opening/closing device with the logic status of the serial control signal or the parallel control signal selected by the selection circuit, or a status detection signal required to perform an abnormality determination; and the abnormality determination signal or the status detection signal is transmitted in series to the microprocessor by way of the serial-parallel converter,
wherein the second multi-channel A/D converter converts analogue detection signals related to conduction currents of part or all of the opening/closing devices into digital values; and the digital conversion data is transmitted to the microprocessor by way of the serial-parallel converter,
and wherein, in response to an input signal inputted from an input sensor, the detection signal of the abnormality detection circuit, and the contents of a control program stored in a program memory, the microprocessor opening/closing-controls the plurality of opening/closing devices, by means of the serial control signal or the parallel control signal, so as to control energization drive of the plurality of electric loads; and the intelligent power module adjusts the reading timing in such a way that, regardless of the kind of the control signal, the digital conversion data is always read during the period in which the opening/closing device is driven to be closed.

2. The electronic control apparatus according to claim 1, wherein, in response to a selection command signal based on a selection command data transmitted in series from the microprocessor by way of the serial-parallel converter, the selection circuit selects the serial control signal or the parallel control signal; the selection command data is preliminarily stored in the program memory and collectively transmitted to the buffer memory by way of the serial-parallel converter, at least when the microprocessor starts its operation; and while the microprocessor operates, transmission of a reading acknowledgement or a division acknowledgement is performed.

3. The electronic control apparatus according to claim 1, wherein the selection circuit is a logic sum selection circuit in which, in the case where at least one of the serial control signal transmitted from the microprocessor through the serial-parallel converter and the parallel control signal directly designated without passing through the serial-parallel converter is logic "1", the opening/closing device is driven to be closed, and in the case where both the serial control signal and the parallel control signal are logic "0", the opening/closing device is driven to be opened; and the input circuit for the parallel control signal is biased with a pull-up resistor or a pull-down resistor inside or outside the intelligent power module, and in the case where no input circuit for the parallel control signal is connected, the input signal becomes logic "0".

4. The electronic control apparatus according to claim 3, wherein the selection circuit is provided with a logical sum device which serves as a logic sum selection circuit for selecting the logic sum of the serial control signal and the parallel control signal, a logical multiplication device which serves as a logic multiplication selection circuit for selecting the logic multiplication of the serial control signal and the parallel control signal, and a mode selection terminal; the mode selection terminal is preliminarily connected with the ground or with a stabilized control voltage; and in accordance with the logic level of the mode selection terminal, the output of the logic sum selection circuit or the logic multiplication selection circuit becomes effective.

5. The electronic control apparatus according to claim 1, wherein the selection circuit is a logic multiplication selection circuit in which, in the case where both the serial control signal transmitted from the microprocessor by way of the serial-parallel converter and the parallel control signal directly designated without passing through the serial-parallel converter are logic "1", the opening/closing device is driven to be closed, and in the case where at least one of the serial control signal and the parallel control signal is logic "0", the opening/closing device is driven to be opened; and the input circuit for the parallel control signal is biased with a pull-up resistor or a pull-down resistor inside or outside the intelligent power module, and in the case where no input circuit for the parallel control signal is connected, the input signal becomes logic "1".

6. The electronic control apparatus according to claim 5, wherein the selection circuit is provided with a logical sum device which serves as a logic sum selection circuit for selecting the logic sum of the serial control signal and the parallel control signal, a logical multiplication device which serves as a logic multiplication selection circuit for selecting the logic multiplication of the serial control signal and the parallel control signal, and a mode selection terminal; the mode selection terminal is preliminarily connected with the ground or with a stabilized control voltage; and in accordance with the logic level of the mode selection terminal, the output of the logic sum selection circuit or the logic multiplication selection circuit becomes effective.

7. The electronic control apparatus according to claim 1, wherein the parallel control signal is a pulse-width modulation control signal in which the pulse period is constant and the proportion of the pulse ON time to the ON-and-OFF period is variable or a pulse output control signal in which the pulse period is variable and the proportion of the pulse ON time to the ON-and-OFF period is constant, wherein the second multi-channel A/D converter collaborates with a reading timing control circuit so as to apply digital conversion to the analogue detection signal proportional to the conduction current of the opening/closing device, and returns a report to the microprocessor by way of the serial-parallel converter, when a reading permission signal is generated; and in response to a sampling hold command transmitted from the microprocessor by way of the serial-parallel converter, the reading timing control circuit supplies an A/D conversion command to the second multi-channel A/D converter, and generates the reading permission signal when the second multi-channel A/D converter generates an A/D conversion completion signal or when a predetermined conversion waiting time elapses, wherein, in the case where the sampling hold command is received while a circuit-opening command is issued to the opening/closing device or at a time instant immediately after a circuit-closing command is issued, the reading timing control circuit becomes standby until a circuit-closing drive command is issued through a driving command signal, which is the parallel control signal or the serial control signal; the reading timing control circuit waits for an acknowledgement until a current detection signal completely rises after the opening/closing device is driven to be closed, and then generates the A/D conversion command; and in the case where the sampling hold command is received at a timing when the opening/closing device is closed and the current detection signal has completely risen, the reading timing control circuit waits for the completion of changing the input channels at a time when the sampling hold command is received, and then issues the A/D conversion command, and wherein the reading timing control circuit generates the reading permission signal, in the case where, when the second multi-channel A/D converter generates the A/D conversion completion signal or when a predetermined conversion waiting time elapses, the circuit-closing drive command is still being issued through the driving command signal; and in the case where, at a timing when the reading permission signal is to be generated, a circuit-opening cutoff command has already been generated through the driving command signal, the reading timing control circuit becomes standby and waits for an acknowledgement until the circuit-closing drive command is issued again through the driving command signal and the current detection signal completely rises.

8. The electronic control apparatus according to claim 7, wherein the microprocessor generates the sampling hold command, and then, when receiving the digital conversion data through the serial-parallel converter, the microprocessor cancels the sampling hold command, as an acknowledgement signal for the completion of reading; and when the sampling hold command is cancelled, the intelligent power module resets the digital conversion data.

9. The electronic control apparatus according to claim 7, wherein the microprocessor generates the pulse-width modulation control signal as a parallel control signal so as to opening/closing-control the opening/closing device of the intelligent power module; concurrently, the microprocessor reads, by way of the serial-parallel converter, the conduction current, of the opening/closing device, to which digital conversion is applied by the second multi-channel A/D converter, and calculates the average load current by multiplying the value of the read conduction current by the conduction duty, which is the proportion of the ON time of the pulse-width modulation control signal to the ON-and-OFF period and determined by the microprocessor.

10. The electronic control apparatus according to claim 7, wherein the microprocessor is further connected with a first multi-channel A/D converter; and the first multi-channel A/D converter applies digital conversion to at least the value of a divided voltage obtained by dividing the power-source voltage of the external power source so as to create voltage data proportional to the power-source voltage, and wherein the microprocessor estimates the power-source voltage, based on at least one of the first voltage data that is proportional to the power-source voltage at a time when the sampling hold command is issued and a second voltage data that is proportional to the power-source voltage at a time when the digital conversion data is received from the second multi-channel A/D converter, and then compares the value of the estimated power-source voltage with the value of the energization current of the electric load transmitted from the intelligent power module; in the case where the value of the load resistor of the electric load does not fall within the threshold value range corresponding to a predetermined ambient temperature range, the microprocessor determines in a predictive manner that the electric load is abnormal.

11. The electronic control apparatus according to claim 7, wherein a voltage proportional to the power-source voltage of the external power source is applied, as the reference voltage, to the reference voltage terminal of the second multi-channel A/D converter; the value obtained by applying digital conversion to the load current of the electric load by the second multi-channel A/D converter becomes inversely proportional to the load resistance of the electric load; and in the case where the transmitted value that is in inverse proportion to the load resistance exceeds a threshold range corresponding to a predetermined ambient temperature range, the microprocessor determines in a predictive manner that an abnormality exists in the electric load.

12. The electronic control apparatus according to claim 1, wherein the program memory that collaborates with the microprocessor includes a control program that serves as the simple conduction duty control units that does not depend on the parallel control signal and utilizes the serial control signal; the simple conduction duty control units is a means for obtaining the conduction duty S/N or (N−S)/N by performing circuit-closing drive or circuit-opening cutoff of the open/closing device S times while the serial control signal is transmitted predetermined times N; when the conduction duty is the same as or smaller than 50% and the value of N/S (=γ) is an integer, there is repeated an ON/OFF pattern in which a single ON command and (γ−1) OFF commands are issued in that order; when the conduction duty is the same as or smaller than 50%, the quotient of N/S is γ, and the remainder thereof is δ, there is repeated an ON/OFF pattern in which a single ON command and (γ−1) or γ OFF commands are issued in that order, and a set of γ OFF commands are issued δ times while the pattern is repeated S times; and in the case where the conduction duty exceeds 50%, based on the complement pattern obtained by reversing ONs and OFFs of the ON/OFF pattern at a time when the conduction duty is the same as or smaller than 50%, the OFF commands are issued S times while the pattern is repeated N times, so that the conduction duty of (N−S)/N can be achieved.

13. The electronic control apparatus according to claim 12, wherein, in the simple conduction duty control units, the ON command timing and the OFF command timing of the serial control signal are selected from the data map corresponding to the required conduction duty; the data map is preliminarily stored in the program memory; and in the data map, the ON commands and the OFF commands are arranged in a dispersed manner in order to prevent them from converging.

* * * * *